(12) United States Patent
Byrne et al.

(10) Patent No.: US 8,616,921 B2
(45) Date of Patent: Dec. 31, 2013

(54) FLOOR RUNNER WITH ELECTRICAL OUTLETS

(76) Inventors: Norman R. Byrne, Ada, MI (US);
Robert L. Knapp, Rockford, MI (US);
Randell E. Pate, Jenison, MI (US);
Christa R. Anderson, Walker, MI (US)

(*) Notice: Subject to any disclaimer, the term of this patent is extended or adjusted under 35 U.S.C. 154(b) by 0 days.

(21) Appl. No.: 13/494,210

(22) Filed: Jun. 12, 2012

(65) Prior Publication Data

US 2013/0146324 A1 Jun. 13, 2013

Related U.S. Application Data

(60) Provisional application No. 61/496,343, filed on Jun. 13, 2011.

(51) Int. Cl.
*H01R 25/00* (2006.01)
*H01R 27/02* (2006.01)
*H01R 31/00* (2006.01)
*H01R 33/00* (2006.01)

(52) U.S. Cl.
USPC .................................. 439/652; 439/214

(58) Field of Classification Search
USPC .......... 439/652, 214, 120, 121, 209, 210, 211
See application file for complete search history.

(56) References Cited

U.S. PATENT DOCUMENTS

| | | | | | |
|---|---|---|---|---|---|
| 2,963,676 | A | * | 12/1960 | Sneesby et al. | 439/209 |
| 3,187,290 | A | * | 6/1965 | Winders | 439/209 |
| 3,715,627 | A | * | 2/1973 | D'Ausilio | 361/643 |
| 4,780,094 | A | * | 10/1988 | Batty et al. | 439/492 |
| 4,875,871 | A | * | 10/1989 | Booty et al. | 439/209 |
| RE36,030 | E | * | 1/1999 | Nadeau | 439/115 |
| 6,350,135 | B1 | * | 2/2002 | Acklin et al. | 439/211 |
| 6,492,594 | B1 | * | 12/2002 | Magyar et al. | 174/97 |
| 6,827,592 | B2 | * | 12/2004 | McCoy et al. | 439/118 |
| 7,094,077 | B1 | * | 8/2006 | Chen | 439/118 |
| 7,201,589 | B2 | * | 4/2007 | Jong | 439/94 |
| 7,438,566 | B2 | * | 10/2008 | Chen | 439/110 |

FOREIGN PATENT DOCUMENTS

GB     2229869 A * 10/1990 ............. H01R 13/73

* cited by examiner

*Primary Examiner* — Hae Moon Hyeon
(74) *Attorney, Agent, or Firm* — Gardner, Linn, Burkhart & Flory, LLP

(57) ABSTRACT

A floor runner with electrical and/or electronic or data outlets provides a low-profile, unobtrusive power and/or data source along a floor or other support surface. The electrical floor runner may be a one-piece unit of substantially any desired length, and typically includes a power cord with plug or connector at one end for coupling to a wall outlet or the like, and a power/data block at the other end for receiving power and/or data couplers for other devices, such as computers and electronics, lighting, etc. A middle portion is a strong, low-profile region that houses and protects electrical wiring held internally, and that is minimally intrusive for use in walking areas. Optionally, the floor runner may be modular so that its overall length or configuration (e.g., straight or angled) can be changed as desired.

19 Claims, 29 Drawing Sheets

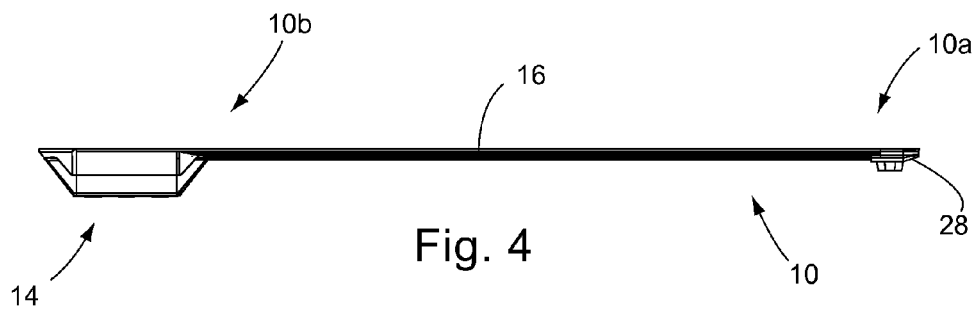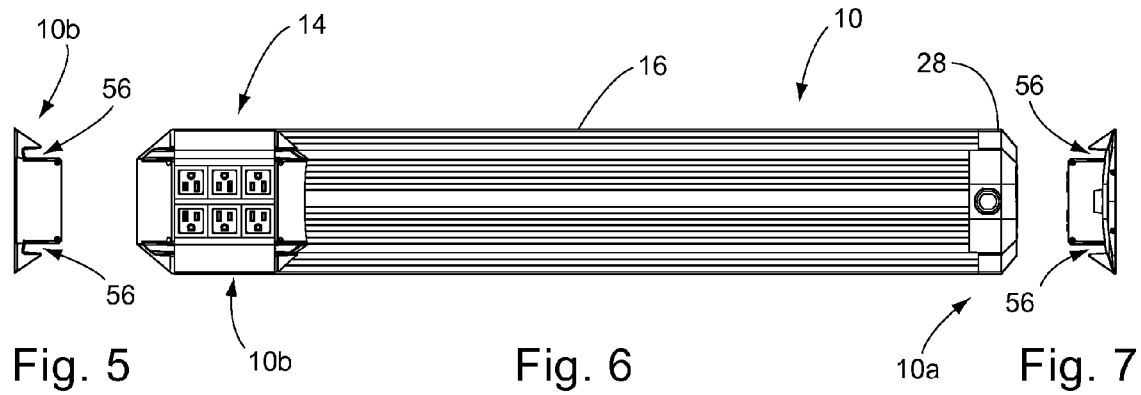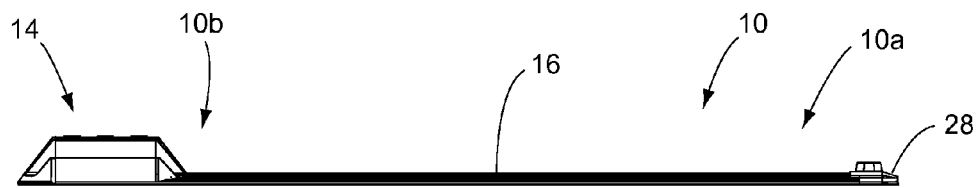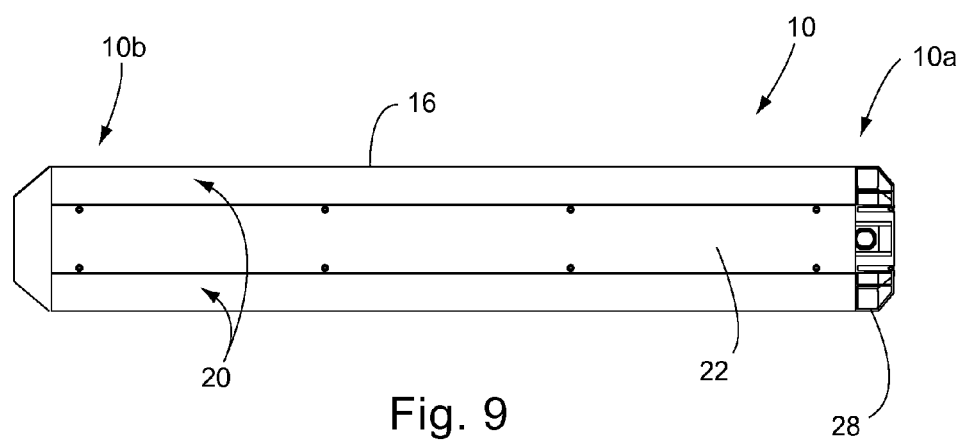

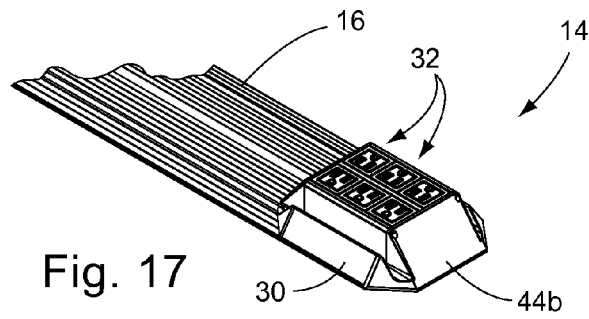
Fig. 17
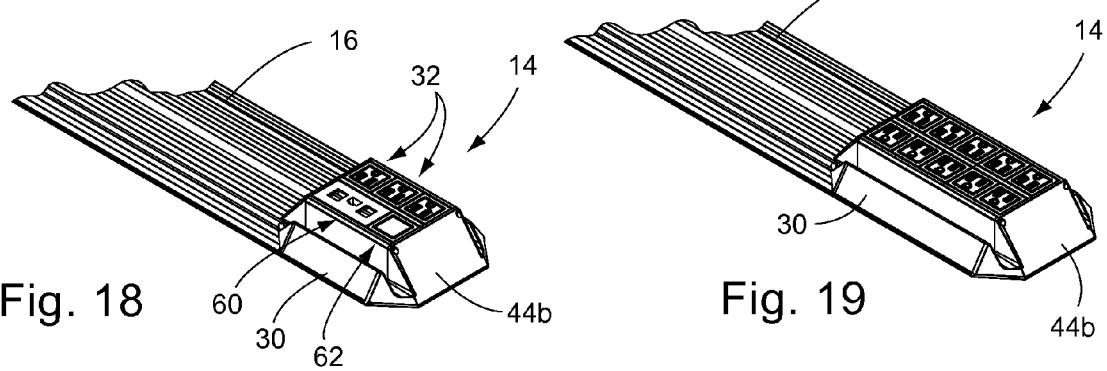
Fig. 18
Fig. 19
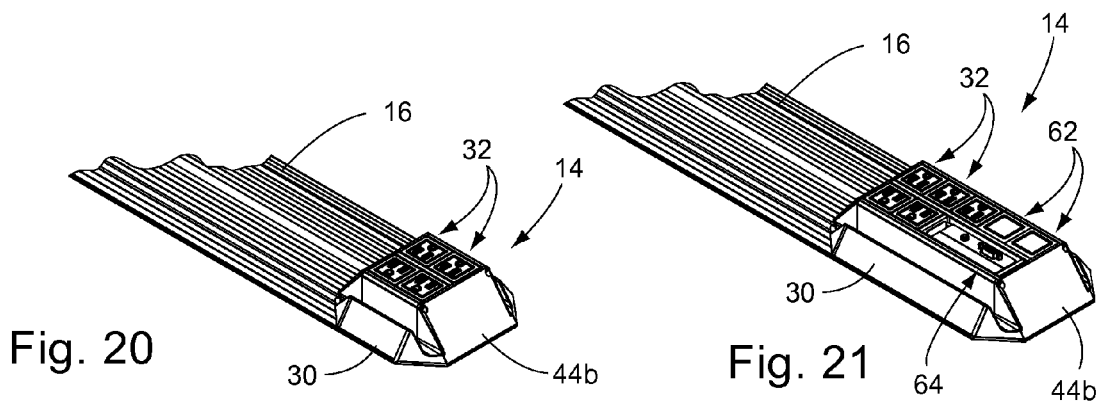
Fig. 20
Fig. 21
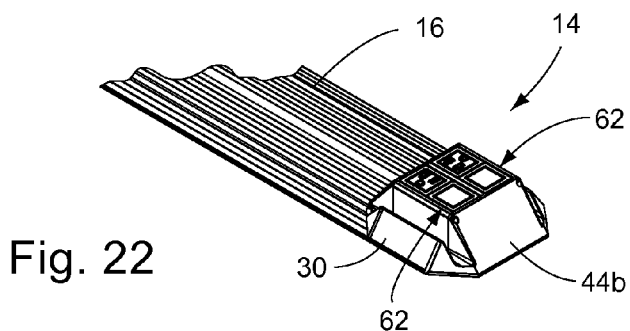
Fig. 22

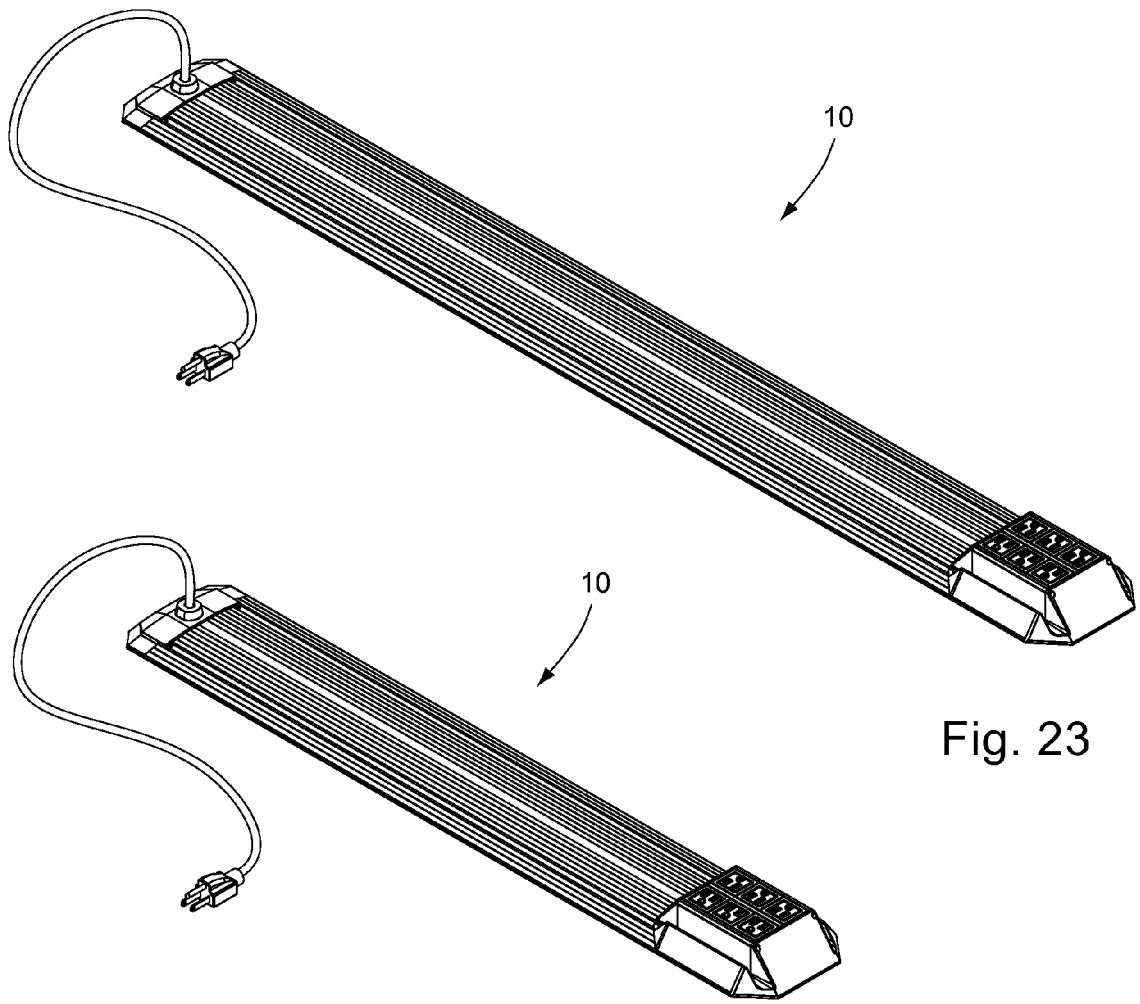
Fig. 23
Fig. 24
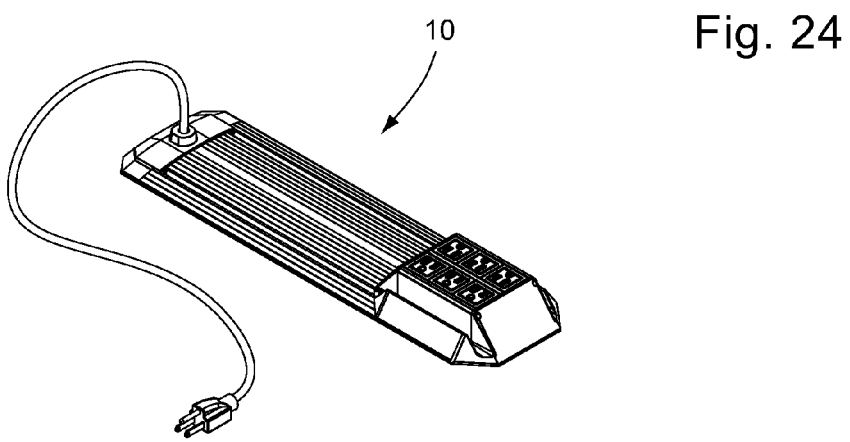
Fig. 25

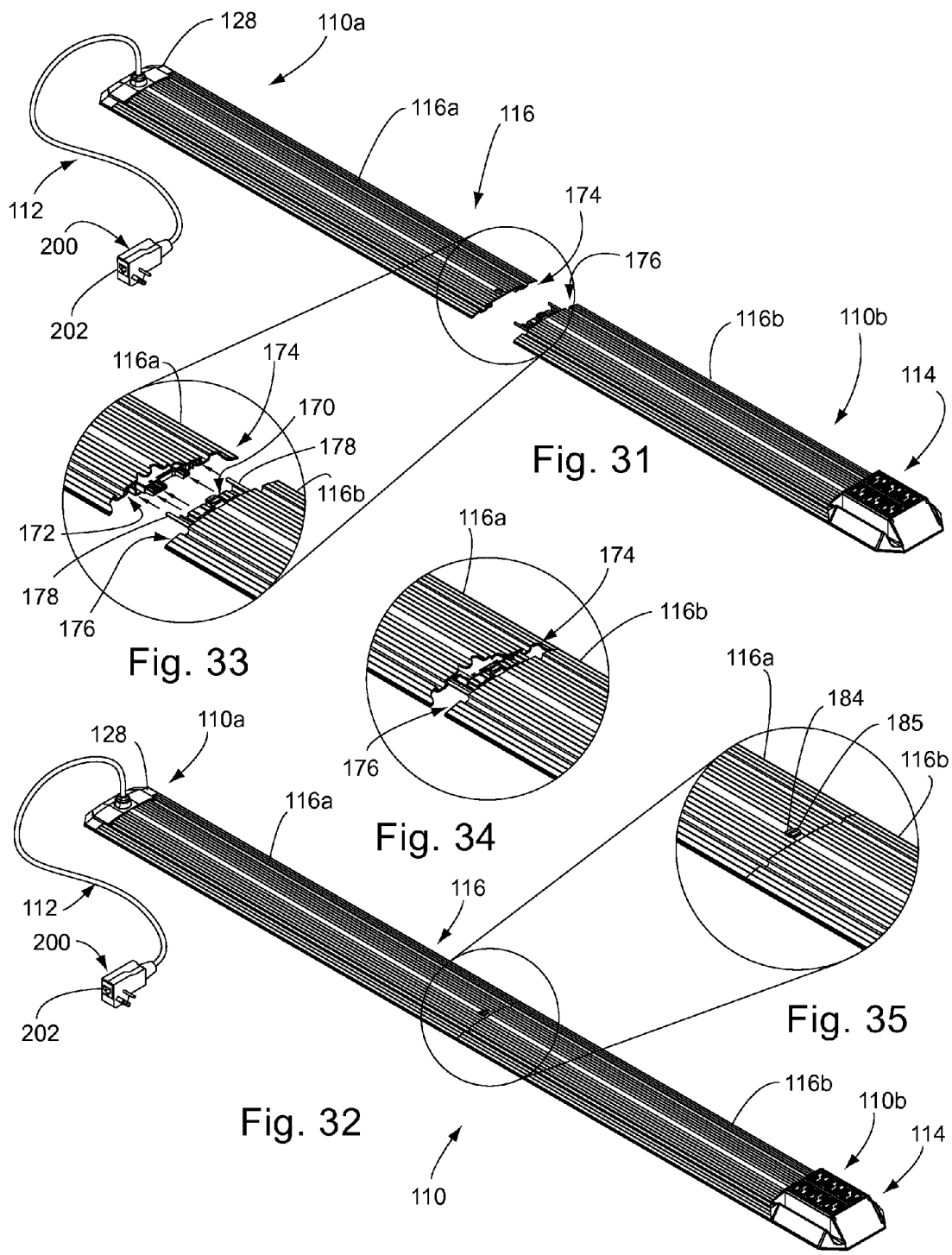

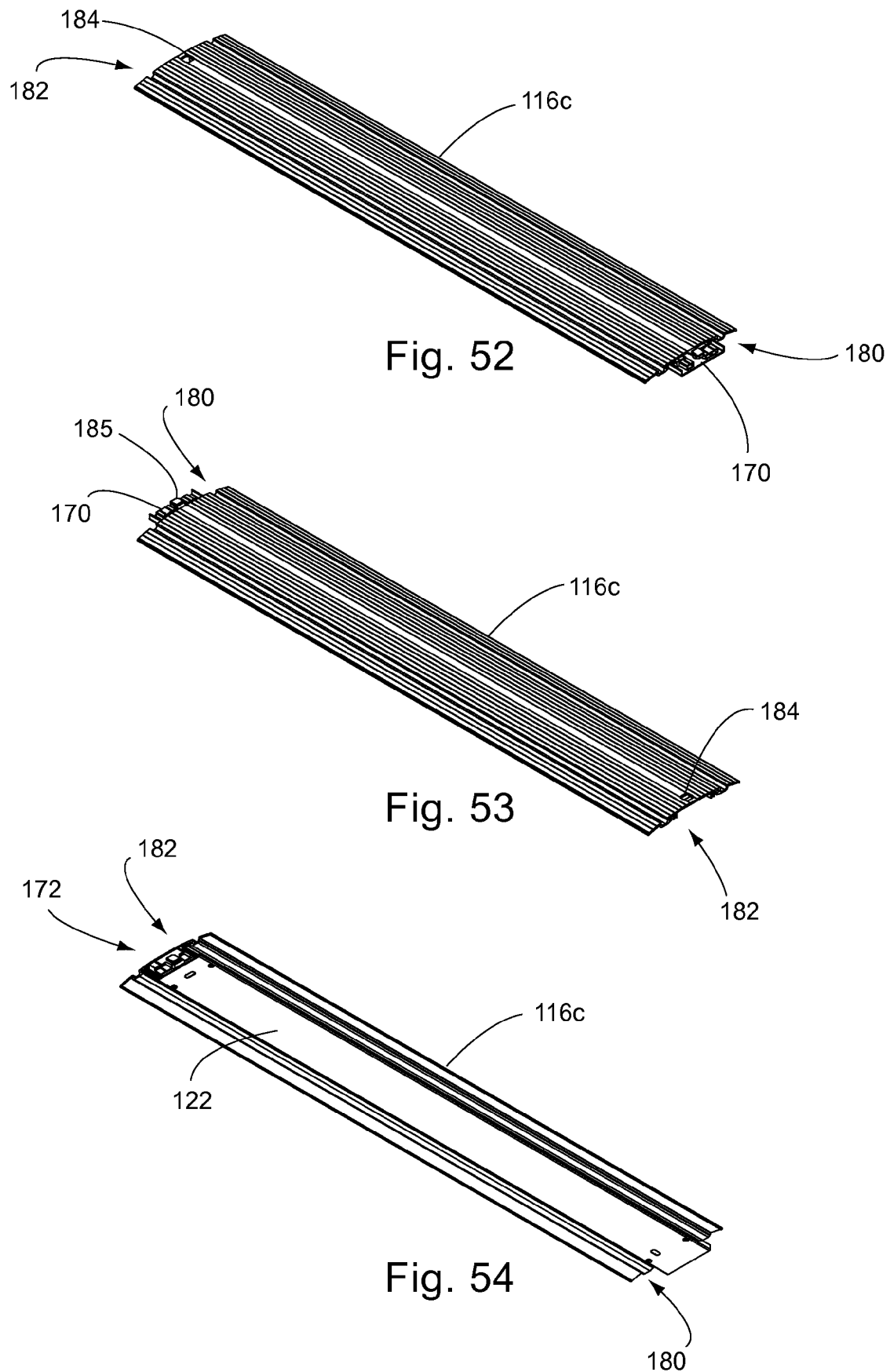

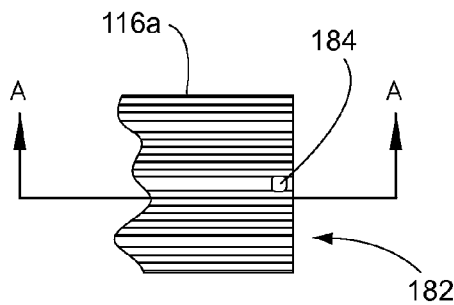
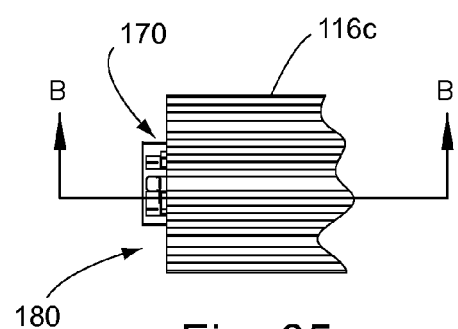
Fig. 64    Fig. 65
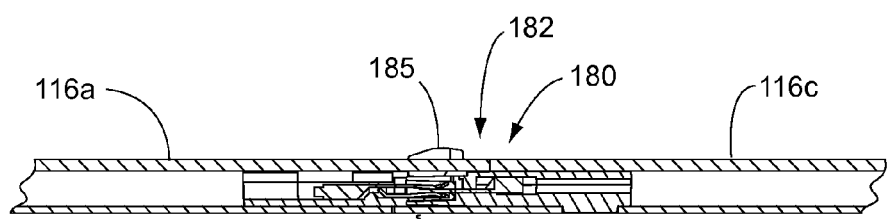
SECTION A-A    Fig. 66    SECTION B-B
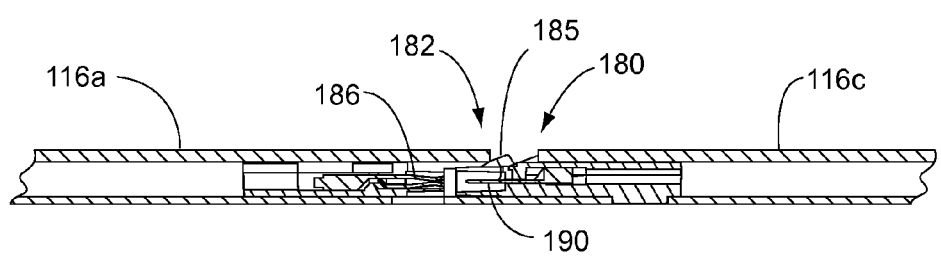
SECTION A-A    Fig. 67    SECTION B-B
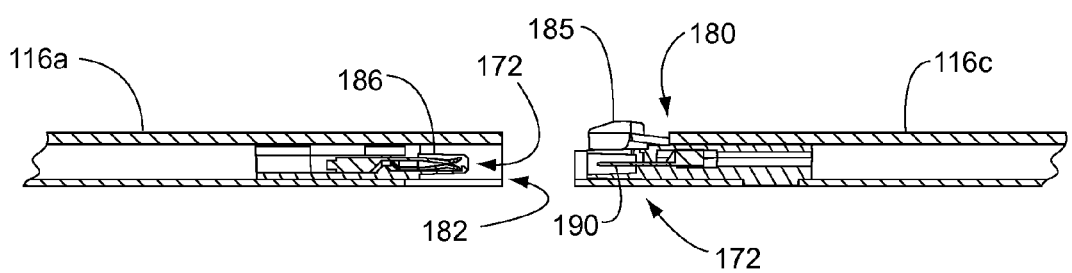
SECTION A-A    Fig. 68    SECTION B-B

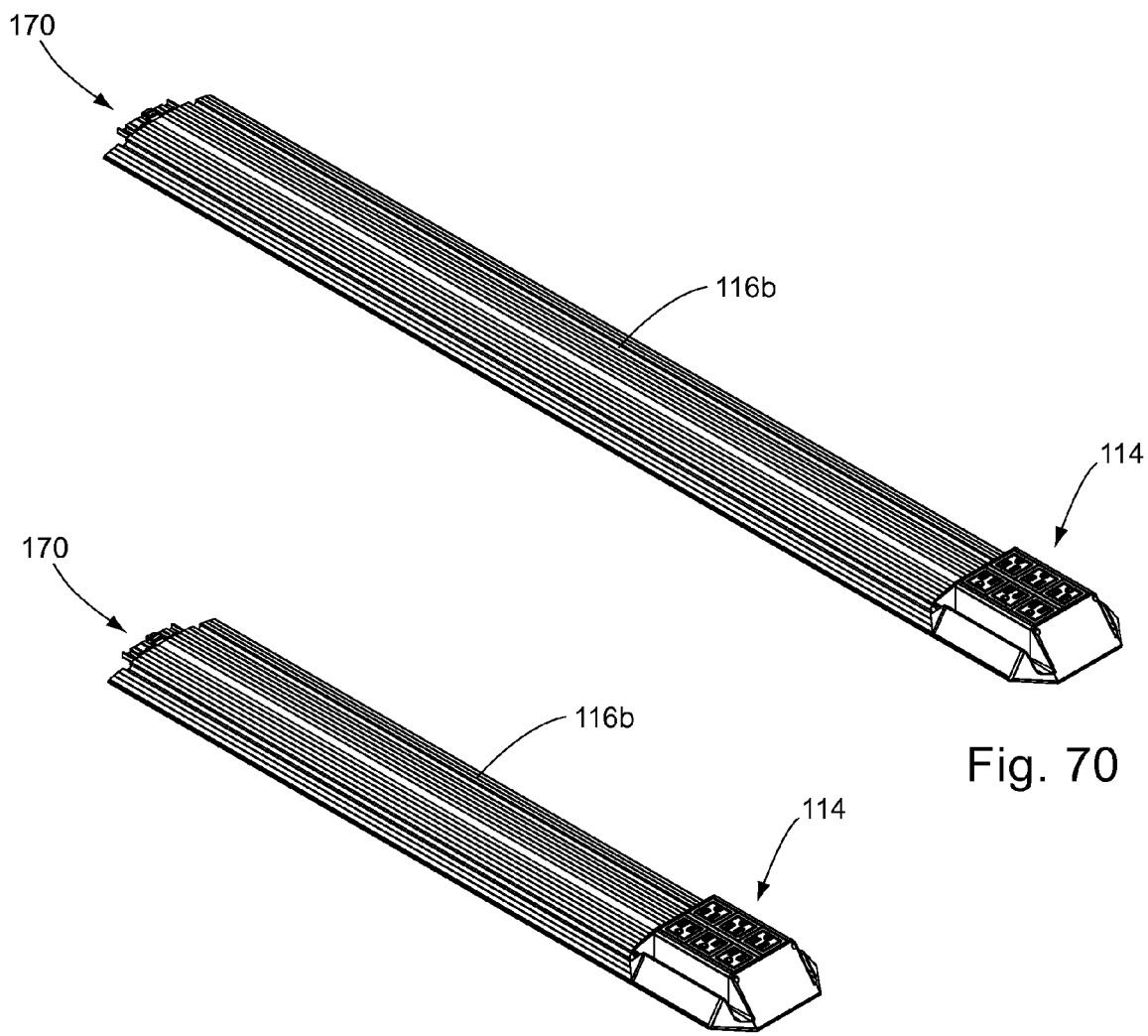
Fig. 70
Fig. 71
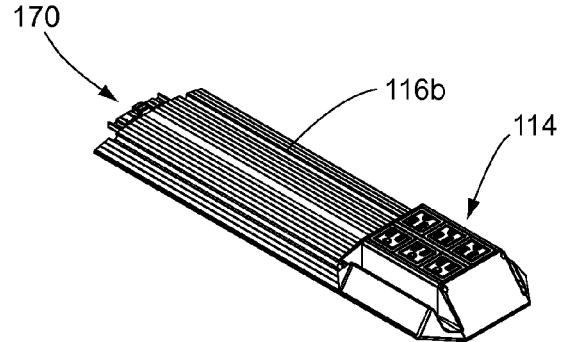
Fig. 72

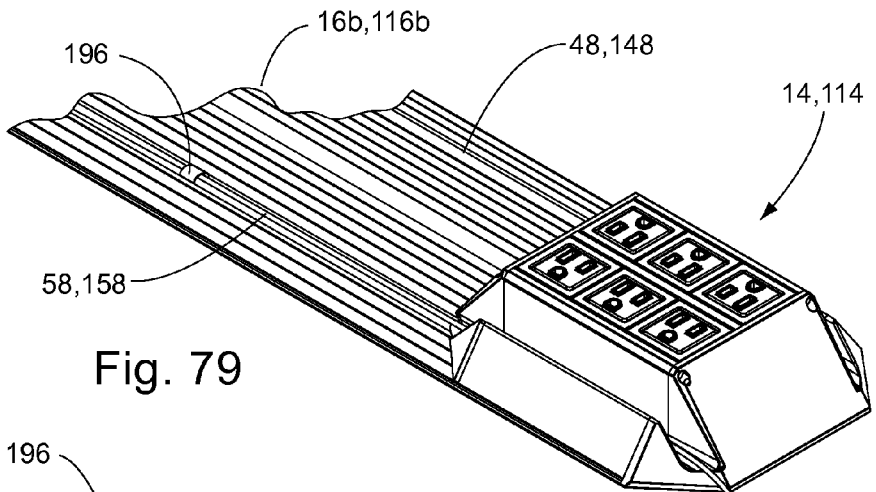
Fig. 79
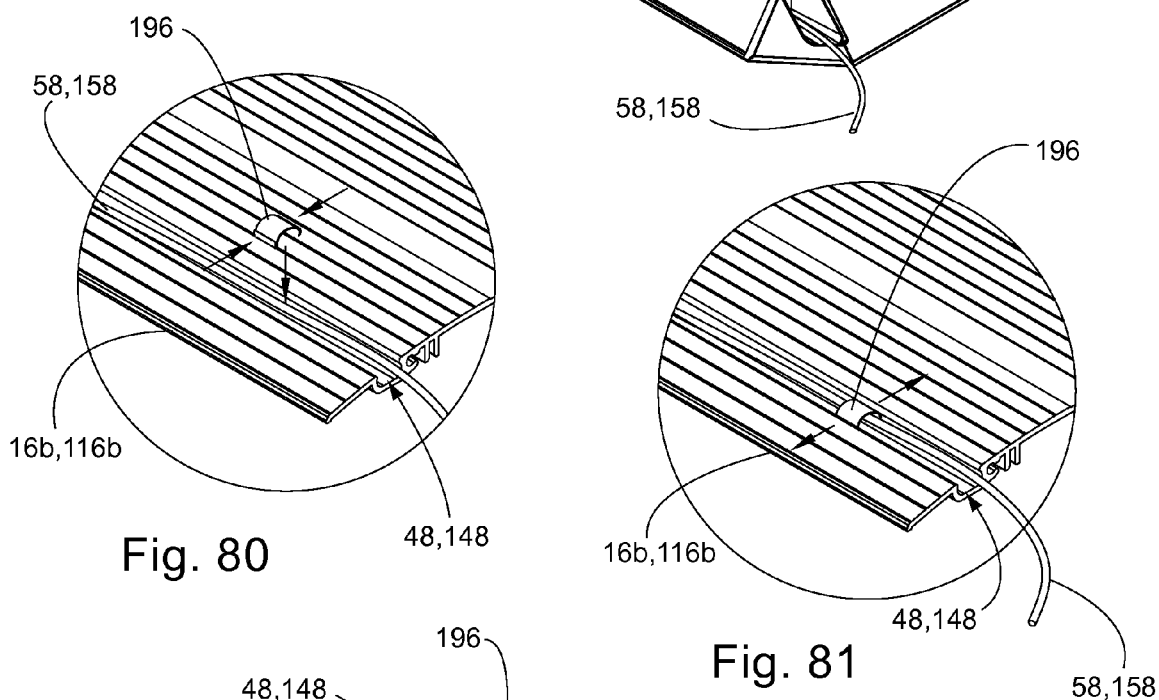
Fig. 80
Fig. 81
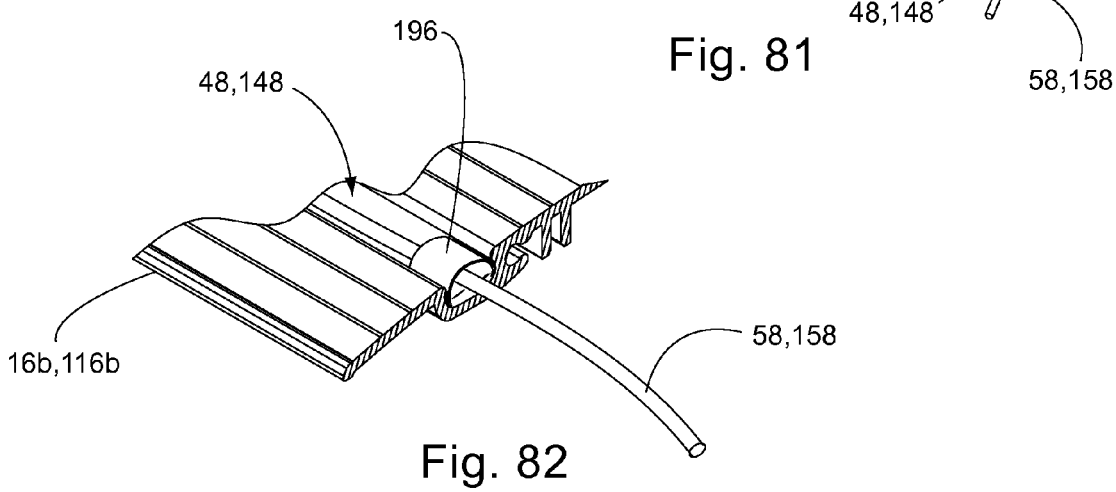
Fig. 82

FLOOR RUNNER WITH ELECTRICAL OUTLETS

CROSS REFERENCE TO RELATED APPLICATION

The present application claims the priority benefit of U.S. provisional application Ser. No. 61/496,343, filed Jun. 13, 2011, which is hereby incorporated herein by reference in its entirety.

FIELD OF THE INVENTION

The present invention relates to electrical wiring extensions and, more particularly, to electrical wiring extensions for use in exposed areas such as along floor surfaces.

BACKGROUND OF THE INVENTION

Extension cords are commonly used for temporarily routing electricity or electrical signals from a power or data source to a different area or location, such as in a home or office building. When extension cords are laid across flooring or walking areas, floor runners or cord protectors may be used to temporarily house the extension cord in an effort to reduce tripping hazards.

SUMMARY OF THE INVENTION

The present invention provides an electrical floor runner that can be formed or cut to a desired length, which internally incorporates electrical wiring (such as for power and/or data), and power or data outlets at one end thereof. The floor runner may be assembled as a modular unit, so that users can select a desired length and/or configuration of floor runner for a desired application. The floor runner may include a customizable power/data outlet housing that facilitates use of a desired number or type (or combination) of power and/or data outlets. The floor runner typically includes a low-profile extrusion that is substantially rigid to resist damage or lifting from a floor surface, and can be used as a permanent or semi-permanent wiring extension device, such as for use in reconfigurable office spaces.

According to one aspect of the invention, an electrical floor runner includes a first end portion; a middle portion, and a second end portion opposite the first end portion. A housing is coupled to the second end portion and is configured to support a plurality of power or data outlets. The first end portion is configured to be electrically coupled to a power or data source. At least the middle portion is substantially rigid, and defining an elongate internal channel. Electrical wiring is routed through the elongate internal channel of the middle portion between the first and second end portions, and is electrically connectable to the power or data source. The electrical wiring is further electrically coupled to the power or data outlet or outlets at the housing, so that said power or data outlets are electrically connectable to the power or data source.

Optionally, the housing includes an extrusion portion and a pair of opposite end caps, with the power or data outlets positioned along the extrusion between the end caps. Optionally, the extrusion of the housing is configured to be cut to a desired length to accommodate the number and type of power or data outlets desired. Thus, the length dimension of the housing can be readily selected to support the desired power or data outlets.

Optionally, each of the elongate middle portion and the first and second end portions is formed from an extrusion. The elongate middle portion and the first and second end portions may be unitarily formed of a single extrusion or, optionally, the middle extension portion and the first and second end portions may be formed from separate extrusions having substantially identical cross sections as one another.

Optionally, the elongate middle portion includes one or more middle extension portions that are releasably connectable between the first and second end portions. The middle extension portion may include an angled portion that forms a bend in the floor runner, such as a 90-degree bend. Optionally, the middle extension portion includes, opposite end portions, a first of which includes a male electrical coupler and a second of which includes a female coupler, the male and female electrical couplers of the middle extension configured to electrically engage corresponding couplers of the first and second end portions (or of another middle extension portion) of the floor runner.

Optionally, at least one of the opposite end portions of the middle extension portion includes a mechanical coupler for releasably securing the middle extension portion to one of the first and second end portions of the floor runner. The mechanical coupler may include a pin configured to align the male and female electrical couplers and to provide structural support to the floor runner where the middle portion joins to at least one of the first and second end portions (or to another middle extension portion) of the floor runner.

Optionally, the at least one power or data outlet comprises a spill-resistant electrical power outlet.

Optionally, the first and second end portions and the middle portion each defines an elongate outer channel for receiving an external wire. A retainer-clip may be provided at the elongate outer channel for retaining the external wire at the outer channel.

According to one aspect of the invention, a method for of providing power or data to a remote location along a walkway includes routing electrical wiring through an elongate internal channel of an electrical floor runner having a first end portion, a second end portion, and a substantially rigid middle portion; coupling a housing to the second end portion; positioning at least one power or data outlet at the housing; electrically connecting the electrical wiring to a power or data source; and electrically connecting the electrical wiring to the at least one power or data outlet at the housing to thereby electrically connect the at least one power or data outlet to the power or data source.

Thus, the electrical floor runner of the present invention provides a low-profile, unobtrusive power and/or data source along a floor or walkway or other support surface. The electrical floor runner may be a one-piece unit or a modular unit including one or more extension pieces coupled between opposite end pieces, thus providing a runner of substantially any desired length. A customizable power/data outlet housing allows for substantially any desired combination of power and/or data outlets, which can be changed as needs change in a work area, for example.

These and other objects, advantages, purposes and features of the present invention will become apparent upon review of the following specification in conjunction with the drawings.

BRIEF DESCRIPTION OF THE DRAWINGS

FIG. 4 is a side elevation of the one-piece floor runner;

FIG. 5 is an end elevation of the one-piece floor runner;

FIG. 6 is a top plan view of the one-piece floor runner;

FIG. 7 is another end elevation of the one-piece floor runner;

FIG. 8 is a another side elevation of the one-piece floor runner;

FIG. 9 is a bottom elevation of the one-piece floor runner;

FIGS. 17-22 are perspective views of various optional outlet and outlet/data blocks at an end of the floor runner;

FIGS. 23-25 are perspective views of one-piece floor runners having different lengths;

FIG. 31 is a perspective view of a modular floor runner in accordance with the present invention, shown prior to joining two opposite end portions thereof;

FIG. 32 is a perspective view of the modular floor runner of FIG. 32, shown fully assembled with the two opposite end portions joined;

FIGS. 33-35 are enlarged perspective views of the junction regions of the modular floor runner end portions, depicting the joining process;

FIGS. 52 and 53 are top perspective views of the optional middle extension portion of the modular floor runner;

FIG. 54 is a bottom perspective view of the optional middle extension portion of the modular floor runner;

FIG. 64 is a top plan view of the female coupler end of the middle extension portion;

FIG. 65 is a top plan view of the male coupler end of the outlet block end portion;

FIGS. 66-68 are combined sectional views of the female coupler end of the middle extension portion taken along line A-A of FIG. 64 and the male coupler end of the outlet block end portion of the outlet block portion taken along line B-B of FIG. 65, depicting the joining steps corresponding to FIGS. 61-63;

FIGS. 70-72 are perspective views outlet block end portions having different lengths;

FIG. 79 is a perspective view of an end portion of the outlet block end portion of FIG. 76, showing retainer clips installed along a channel for the externally routed wires;

FIGS. 80 and 81 are enlarged perspective views showing the installation of retainer clips in the channel for externally routed wires;

FIG. 82 is a further enlarged perspective view showing the retainer clip installed in the channel to retain an externally routed wire;

DESCRIPTION OF THE PREFERRED EMBODIMENTS

Figure 1:
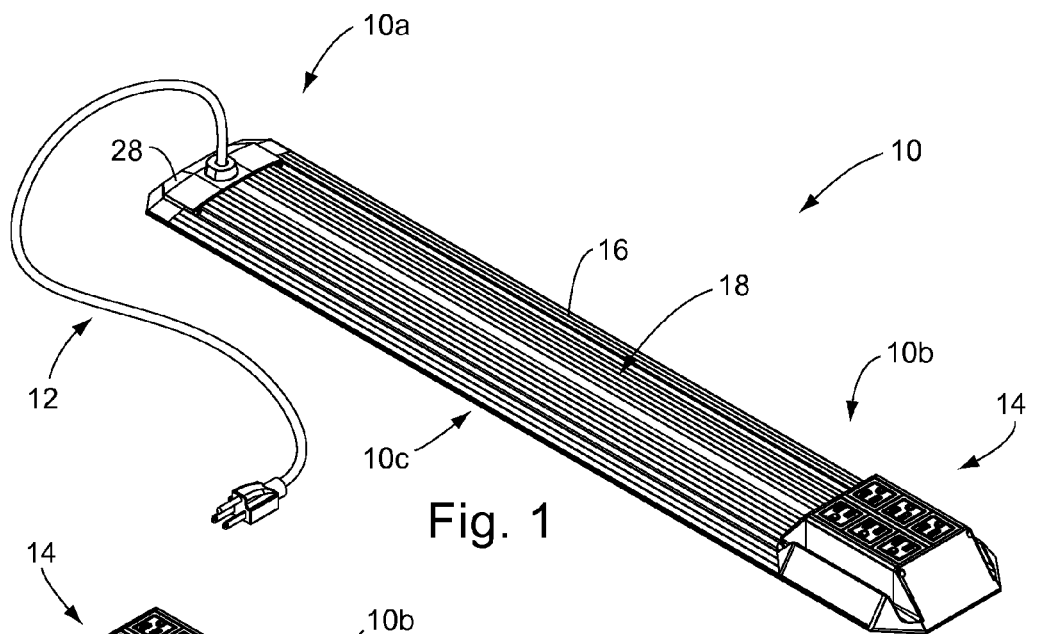
FIGS. 1 and 2 are top perspective views of a one-piece floor runner in accordance with the present invention.
Figure 2:
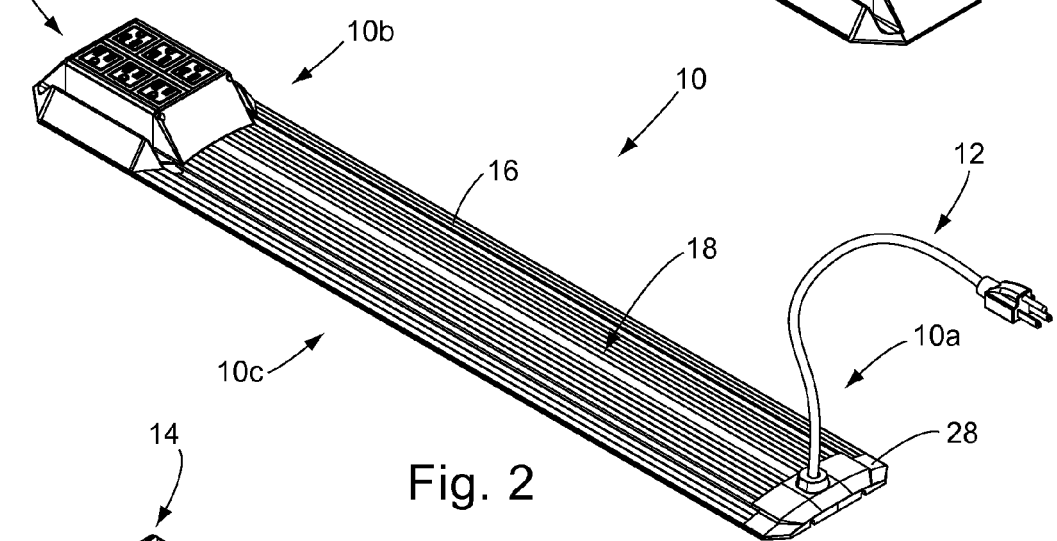
Figure 3:
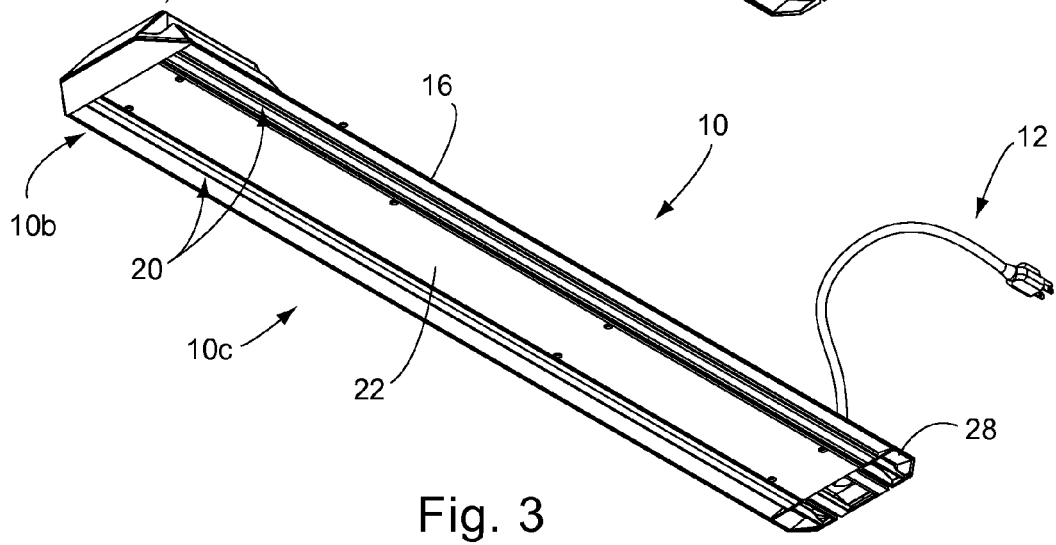
FIG. 3 is a bottom perspective view of the one-piece floor runner of FIGS. 1 and 2.

Referring now to the drawings and the illustrative embodiments depicted therein, an electrical floor runner assembly 10 is provided for routing electrical wiring, such as power and/or data wiring, to a location where power and/or data outlets are desired (FIGS. 1-9). In the illustrated embodiments of FIGS. 1-30, floor runner assembly 10 is configured as a one-piece unit that can be plugged into an electrical wall outlet or data wall outlet via a cord extension 12 at one end 10*a*, and that includes a power/data block 14 at an opposite end 10*b*, with the power/data block in electrical communication with the cord extension 12 (FIGS. 1-3). In the illustrated embodiments of FIGS. 31-84, a modular electrical floor runner assembly 110 is substantially similar to one-piece floor runner assembly 10, but is made of two or more separate sections that can be selectively joined together, to facilitate customization of the system. As will be described in more detail below, the power/data block 14 is adaptable and reconfigurable to support different numbers and types of power and/or data outlets, as desired.

Figure 27:
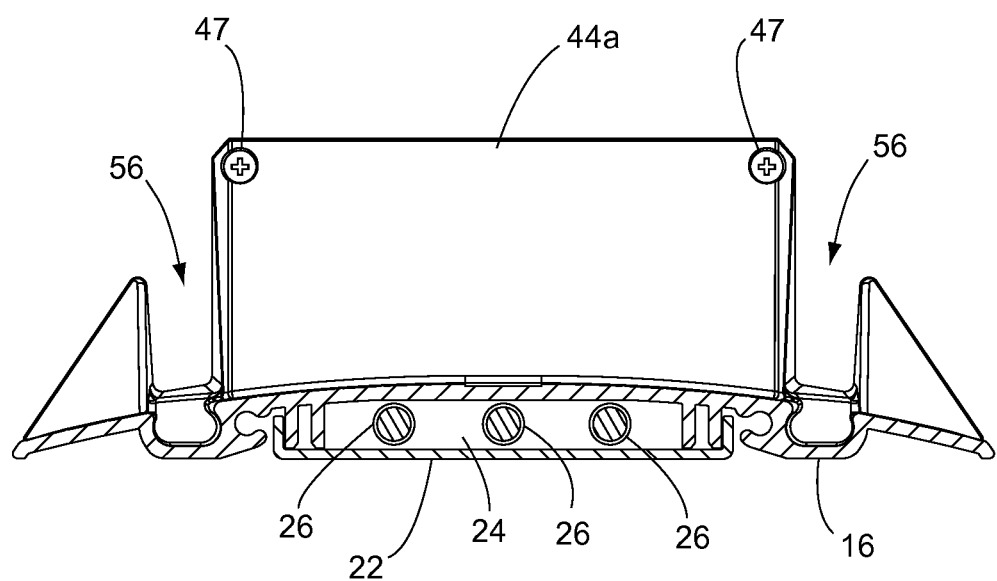
FIG. 27 is a sectional end view of the floor runner, taken along section line XXVII-XXVII of FIG. 26.
Figure 29:
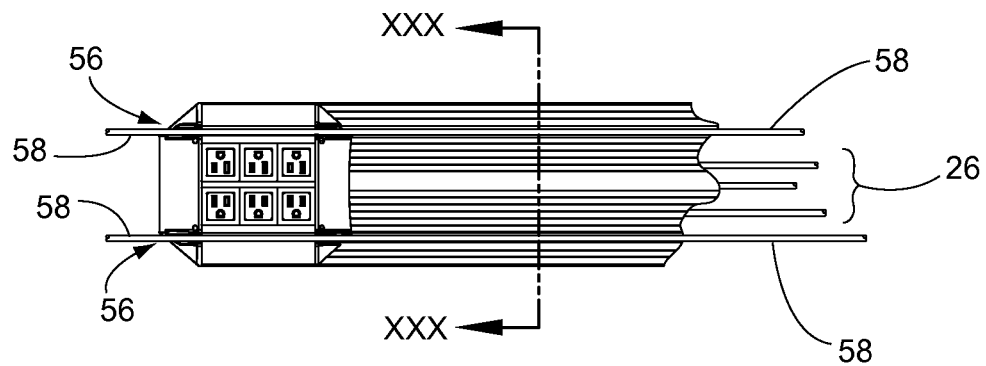
FIG. 29 is a top plan view of an end portion of the floor runner of FIG. 28.
Figure 30:
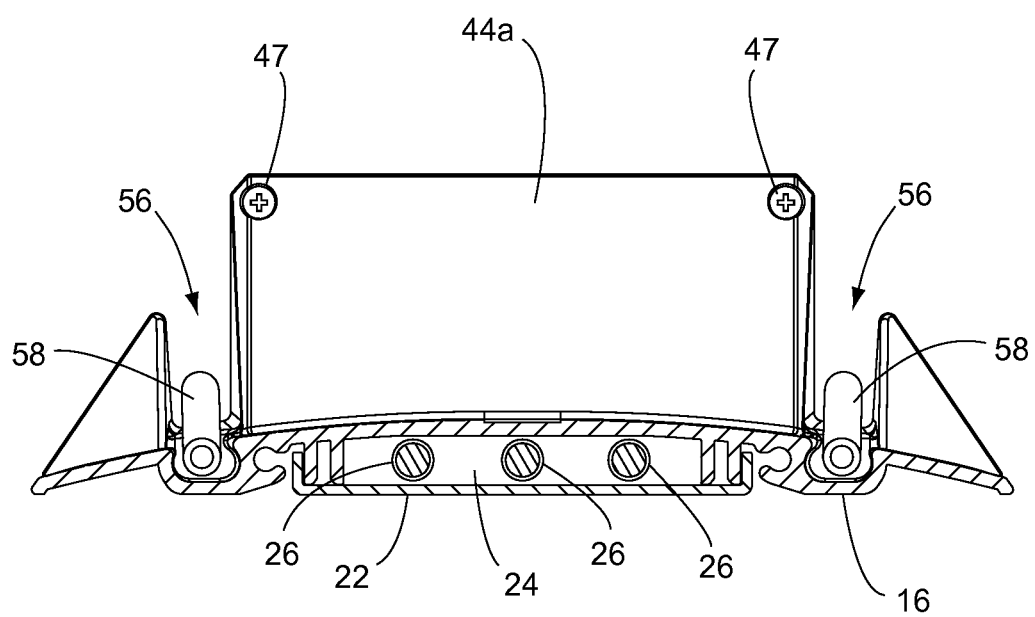
FIG. 30 is a sectional end view of the floor runner, taken along section line XXX-XXX of FIG. 29.
Figure 36:
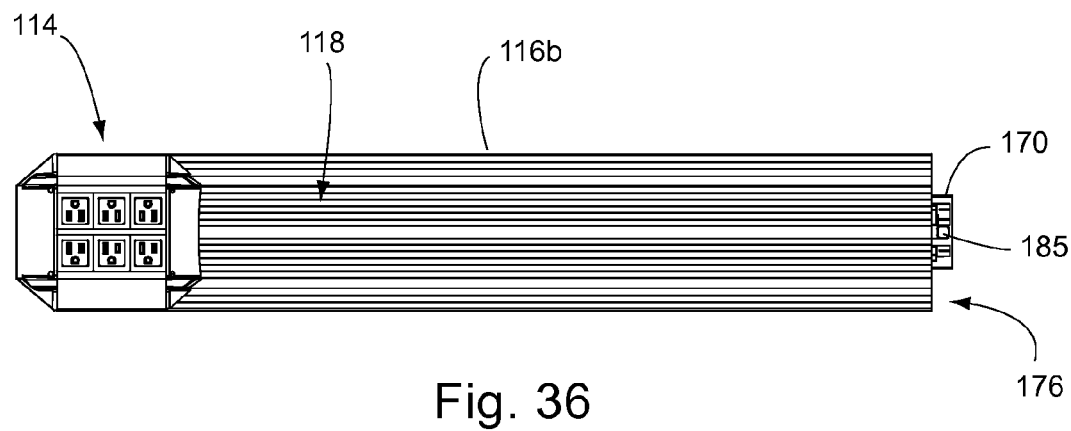
FIG. 36 is a top plan view of the outlet block end portion of the modular floor runner of FIG. 31.
Figure 37:
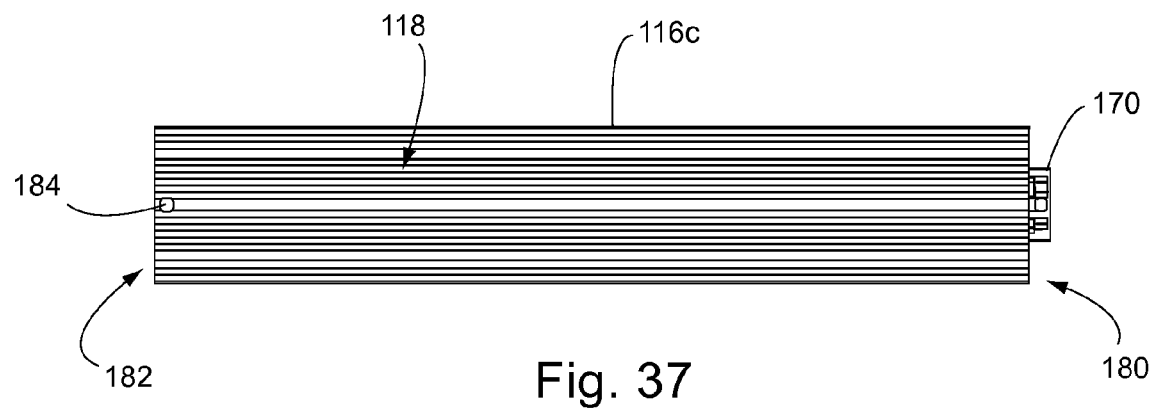
FIG. 37 is a top plan view of a middle extension portion for optional use in the modular floor runner.
Figure 38:
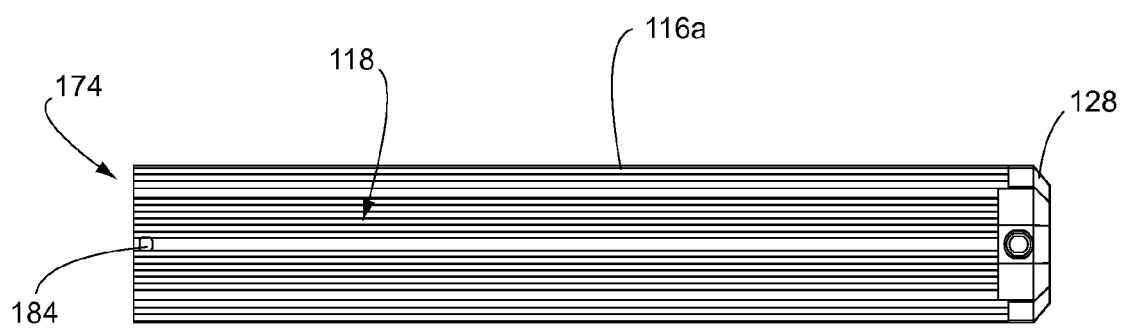
FIG. 38 is a top plan view of the power cord end portion of the modular floor runner of FIG. 31, with the power cord omitted.
Figure 39:
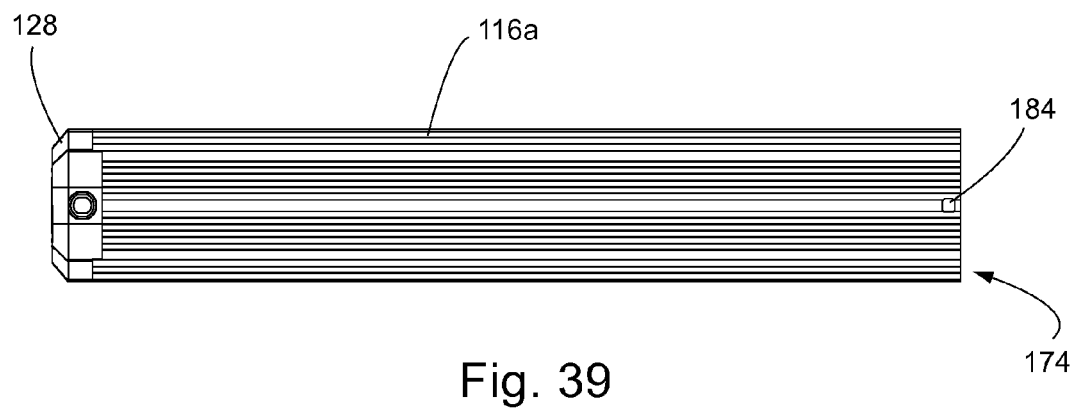
FIG. 39 is another top plan view of the power cord end portion of the modular floor runner.
Figure 40:
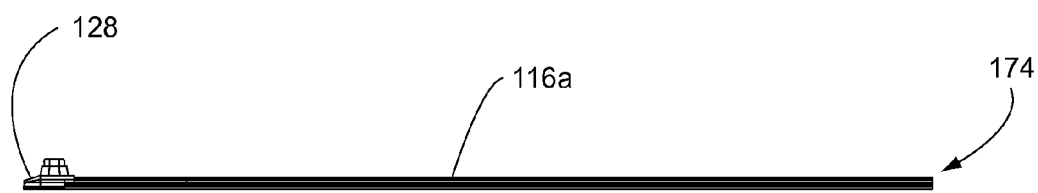
FIG. 40 is a side elevation of the power cord end portion of FIG. 39.
Figure 41:
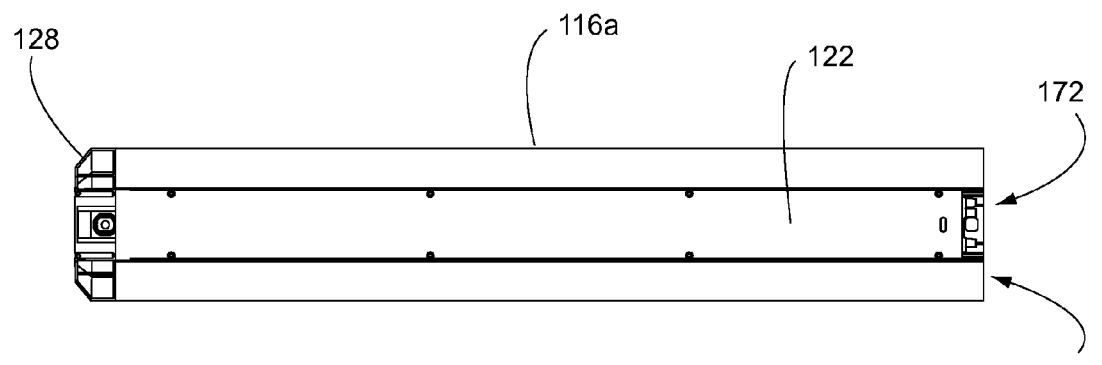
FIG. 41 is a bottom elevation of the power cord end portion.
Figure 42:
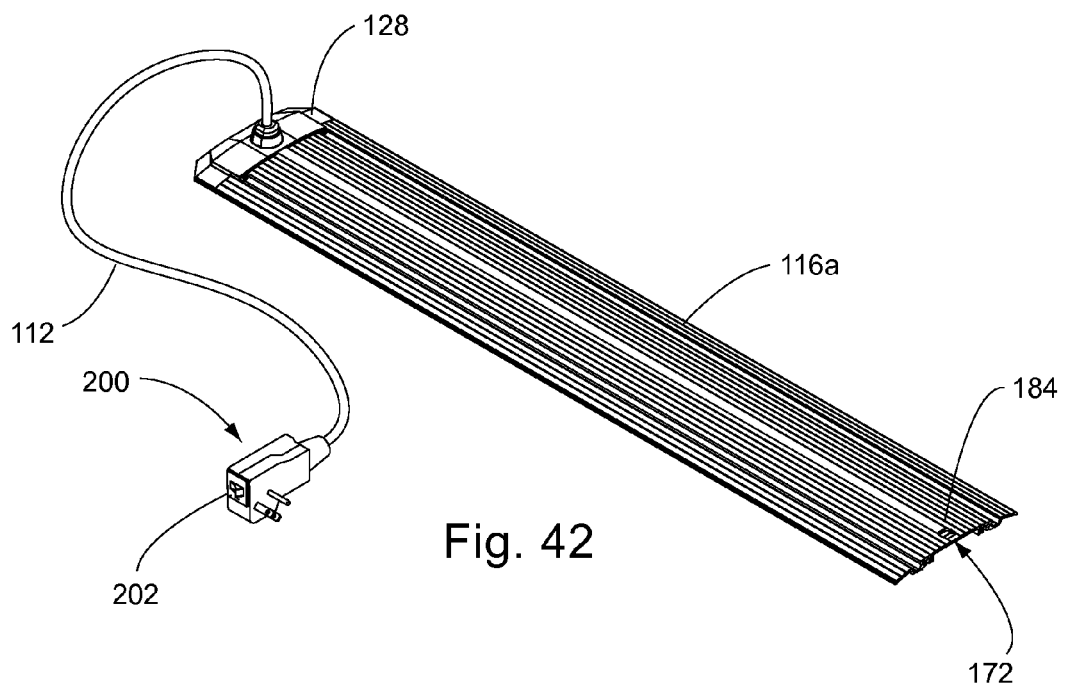
FIG. 42 is a top perspective view of the power cord end portion, shown with its power cord installed.
Figure 43:
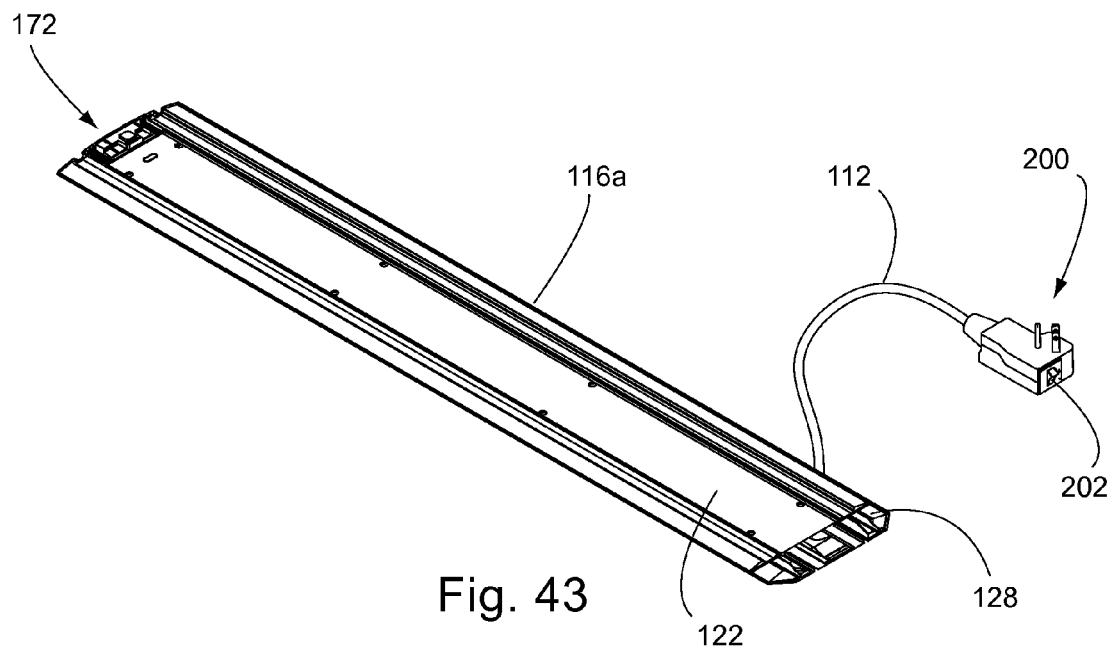
FIG. 43 is a bottom perspective view of the power cord end portion.
Figure 44:
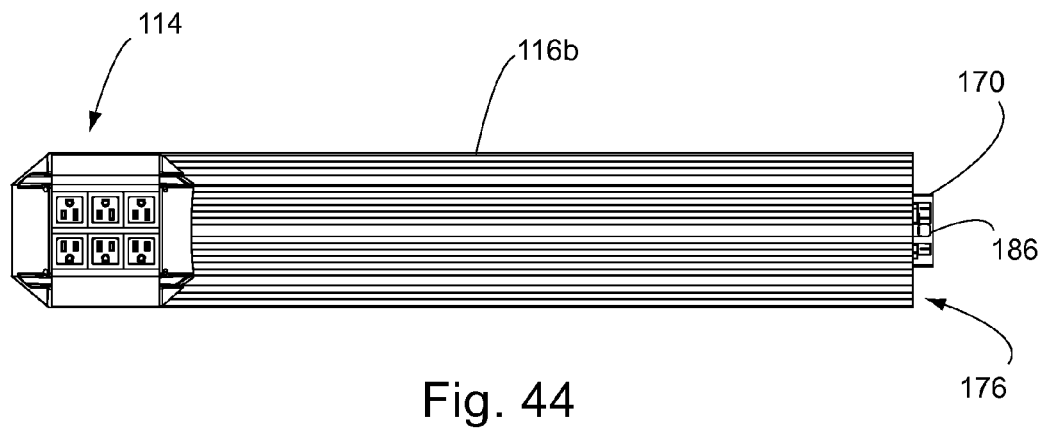
FIG. 44 is a top plan view of the outlet block end portion of the modular floor runner.
Figure 45:
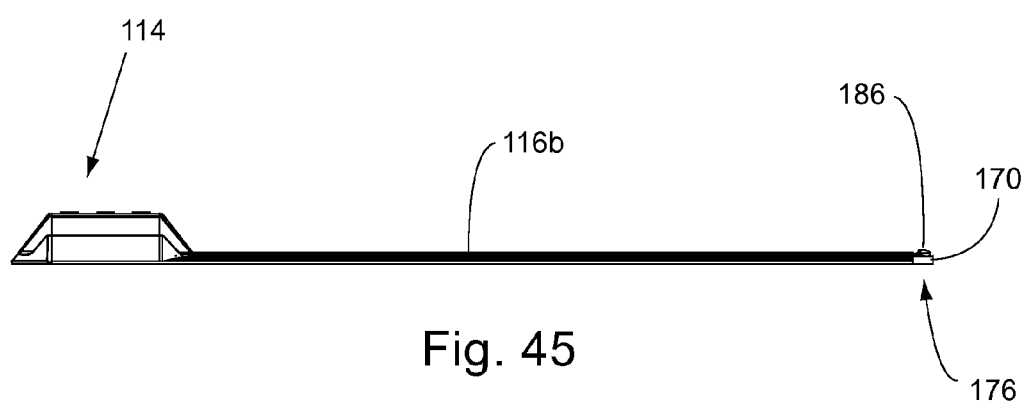
FIG. 45 is a side elevation of the outlet block end portion of FIG. 44.
Figure 46:
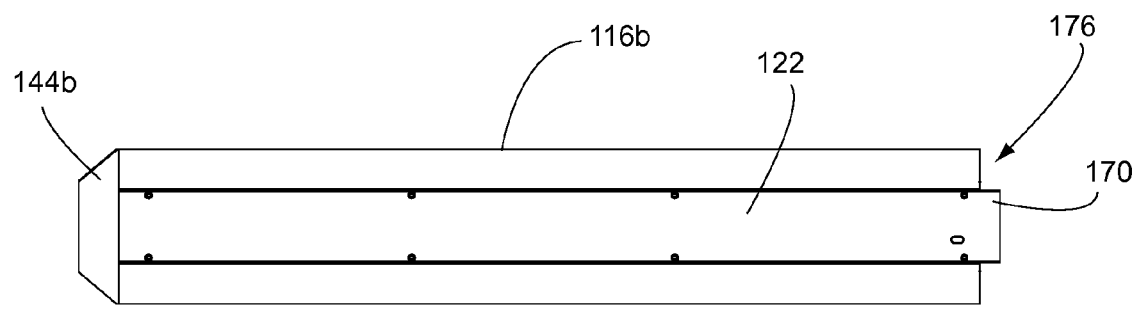
FIG. 46 is a bottom elevation of the outlet block end portion of FIG. 44.
Figure 47:
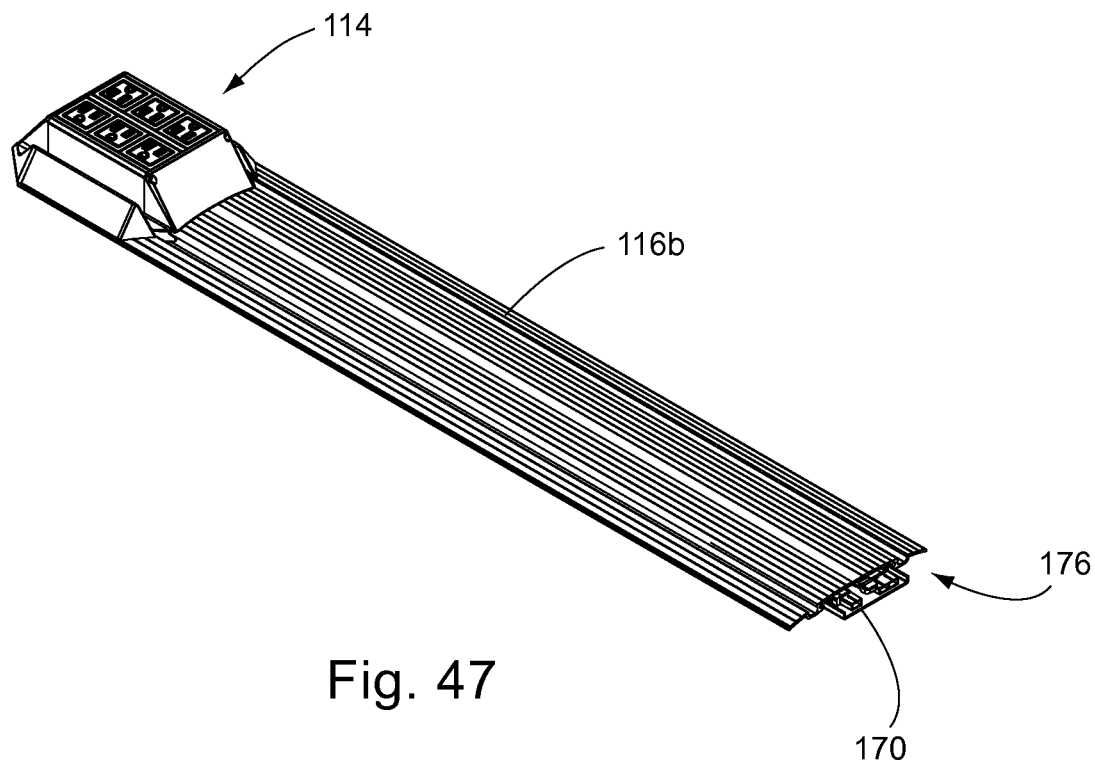
FIG. 47 is a top perspective view of the outlet block end portion.
Figure 48:
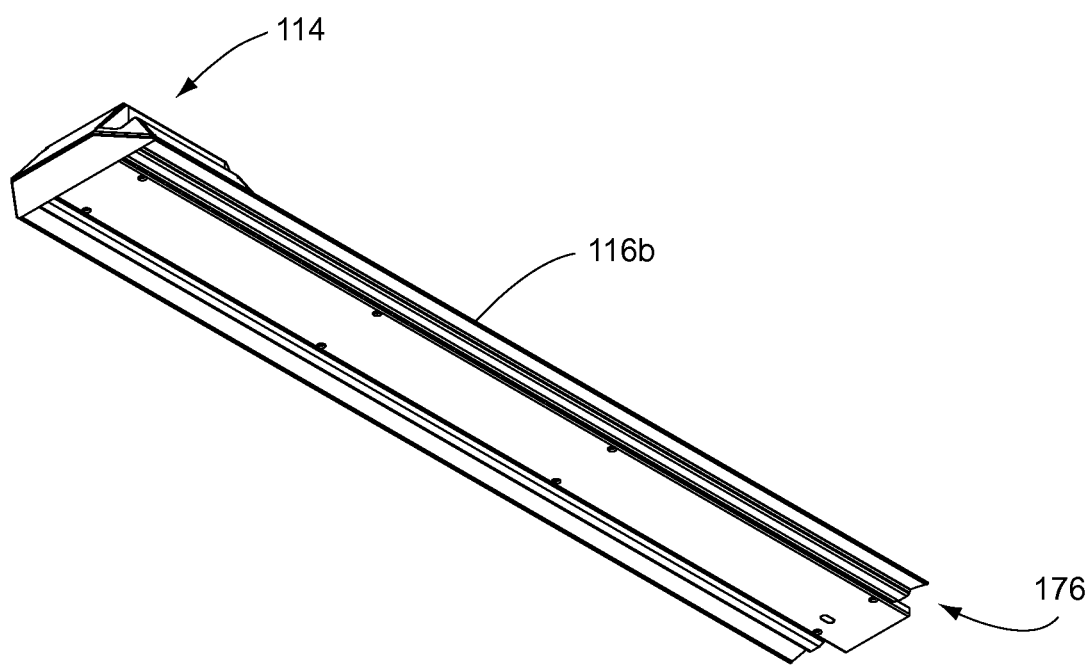
FIG. 48 is a bottom perspective view of the outlet block end portion.
Figure 49:
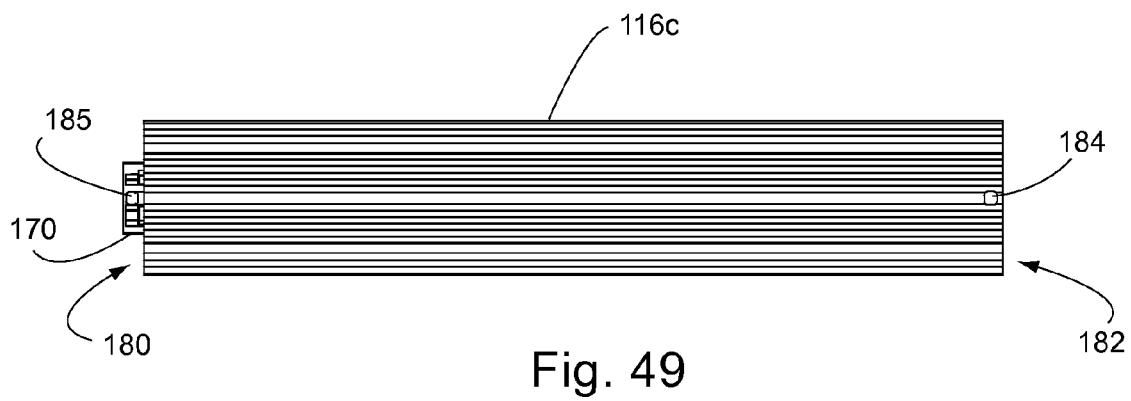
FIG. 49 is a top plan view of the optional middle extension portion of the modular floor runner.
Figure 50:
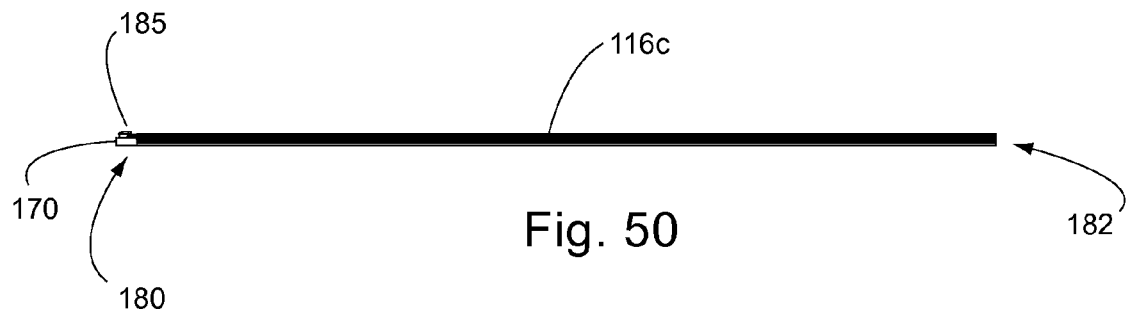
FIG. 50 is a side elevation of the optional middle extension portion of FIG. 49.

Electrical floor runner assembly 10 includes a middle portion 10*c* made up of an elongate extrusion piece 16 having a generally arcuate (convex) upper surface 18 and generally flat lower surfaces 20 (FIGS. 1-3). A bottom cover 22 (FIGS. 3, 9, 15, 27, and 30) is installed along or between lower surfaces 20, and is generally coplanar therewith to form a substantially flat bottom surface of the floor runner assembly. Bottom cover 22 may be generally U-shaped and encloses a channel 24 formed in the underside of extrusion piece 16, such as shown in FIGS. 27 and 30, for housing electrical wiring 26 (FIGS. 13, 14, 15, 27, 29, and 30), which may include "ground", "neutral", and "hot" or "line" conductors, for example. Electrical wiring 26 may be electrically connected to cord extension 12 via end-line butt connections (FIG. 15) in an end cap 28, which attaches to the extrusion piece 16 at the end 10*a* of assembly 10. End cap 28 may be a molded piece that has a profile similar to that of extrusion piece 16, and may include retainer clips or fasteners so that the end cap 28 can be securely retained at the end 10*a* of assembly 10. In the illustrated embodiment, cord extension 12 is a conventional three-conductor A/C power cord that can be plugged into a conventional 110 VAC wall outlet or the like. However, it will be appreciated that substantially any cord extension may be used, such as for electrical power or for data signals, with substantially any desired end connector or coupler, without departing from the spirit and scope of the present invention.

Figure 10:
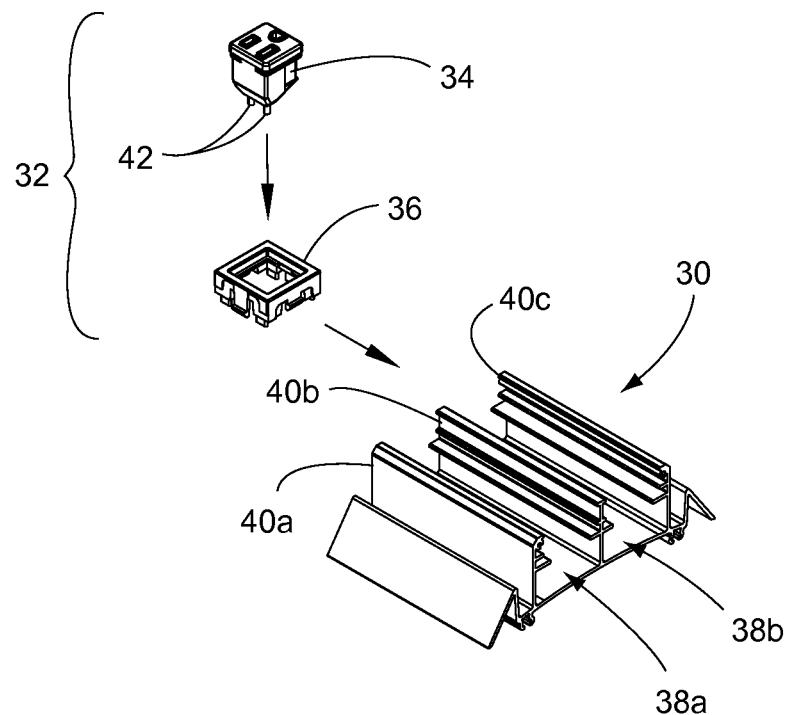
FIGS. 10-14 are perspective views of an outlet block of the floor runner, depicting assembly and installation steps.
Figure 11:
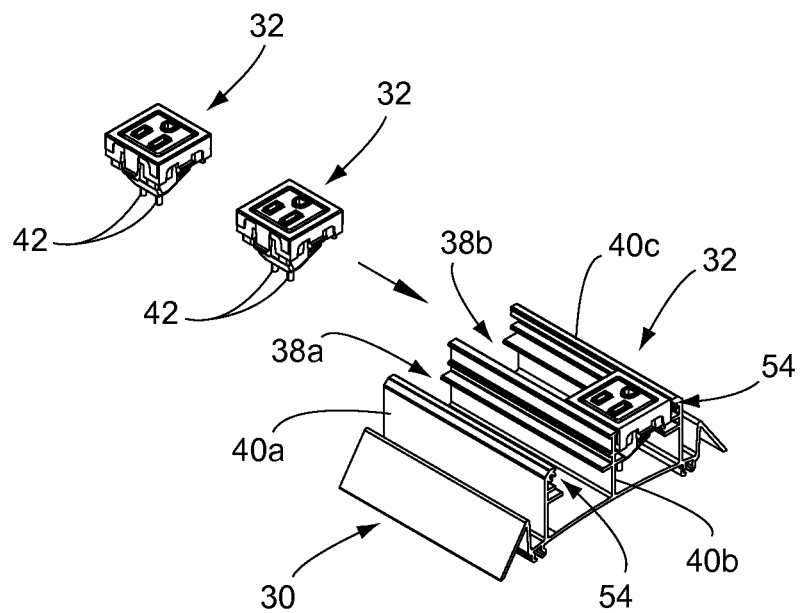
Figure 12:
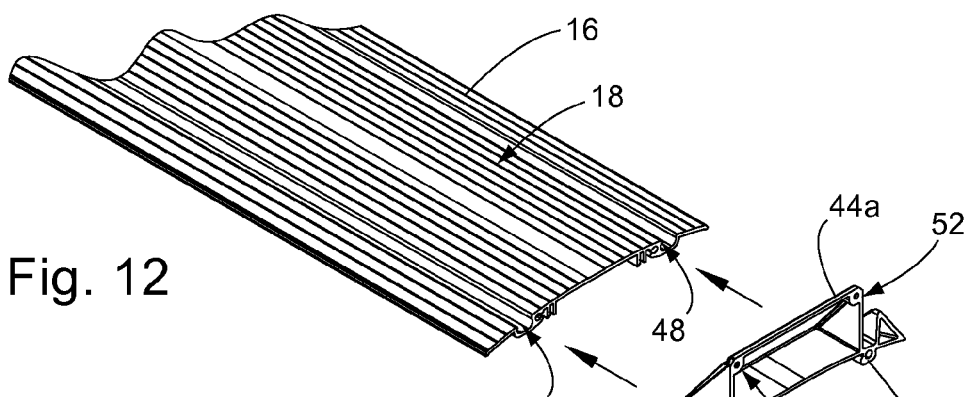
Figure 13:
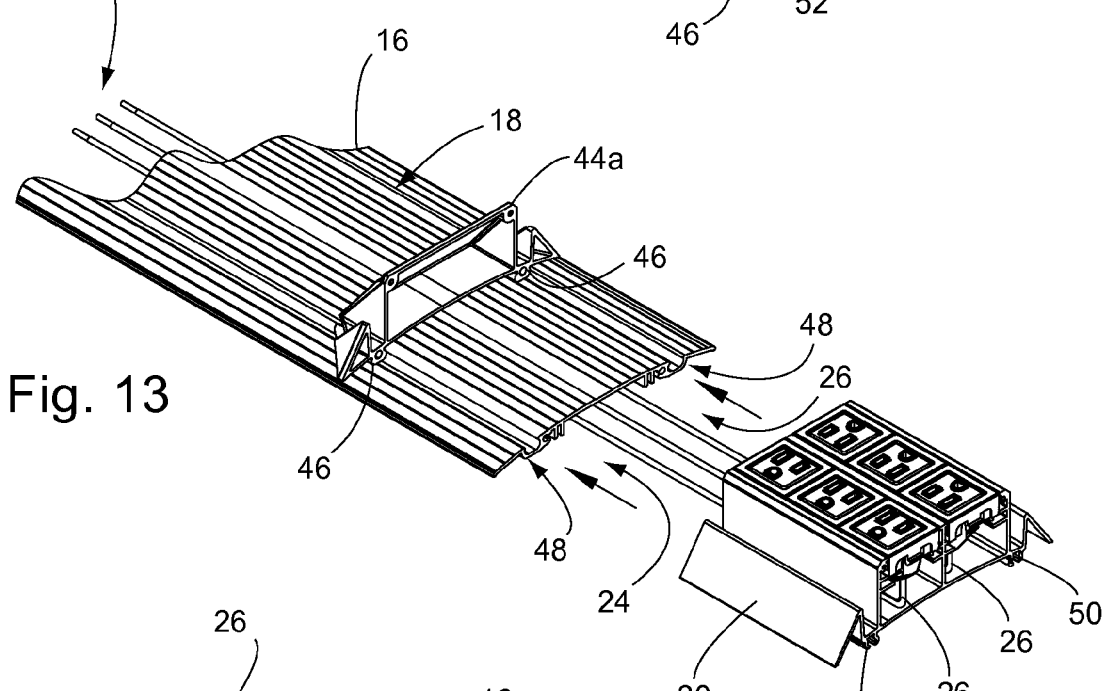
Figure 14:
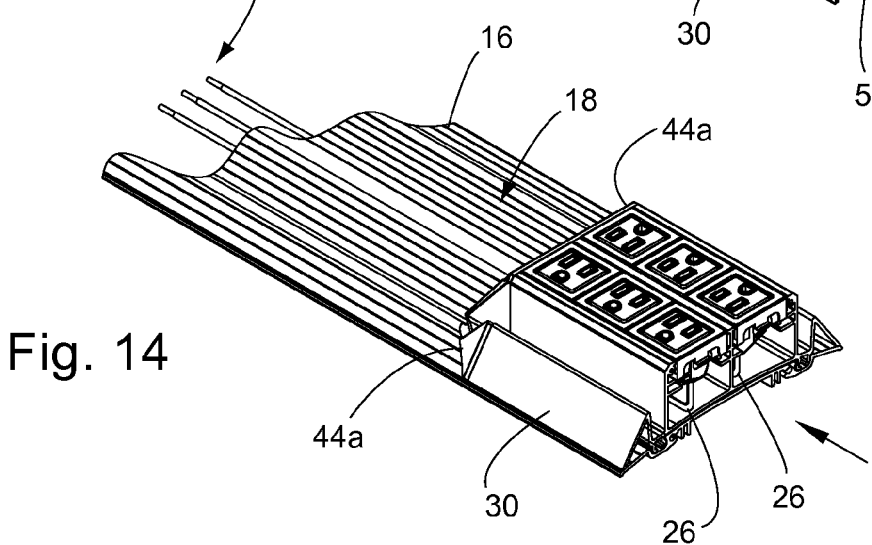

Power/data block 14 is either partially pre-assembled prior to installation on the extrusion piece 16 at the end 10*b* of assembly 10, or may be assembled piece-by-piece onto the extrusion piece 16. Referring to FIGS. 10-14, power/data block 14 includes a housing 30 that is formed as an extrusion, so that housing 30 may be cut to any desired length to accommodate any number and/or type of power or data receptacles or outlets, such as power outlets 32 (FIG. 10), as will be described in more detail below with reference to FIGS. 17-22. Power outlets 32 are each assembled from a conductor receptacle 34 and a mount 36, such as shown in FIGS. 10 and 11. Housing 30 defines channels 38*a*, 38*b* between upstanding sidewalls 40*a-c*, which are shaped to receive power outlets 32 with mounts 36 retained in sliding engagement in one of the channels 38*a* or 38*b* between respective sidewalls (40*a* and 40*b*, or 40*b* and 40*c*). Typically, wiring 26 is electrically coupled to electrical terminals 42 on the underside or backside of each power outlet 32, as shown in FIGS. 13 and 14, prior to the installation of outlets 32 at housing 30. Power outlets 32 may be splash or spill-resistant outlets that are approved for use in upwardly-facing applications as shown, such as enhanced waterproof simplex outlets available from Byrne Electrical Specialists, Inc. of Rockford, Mich.

In the illustrated embodiment of FIGS. 1-16, the housing 30 of power/data block 14 is sized to receive two rows of three power outlets 32 per row, for a total of six power outlets 32 at power/data block 14. A pair of power/data end caps 44*a*, 44*b* complete the power/data block 14, and are installed along extrusion piece 16 on either side of housing 30 (FIGS. 12-16). To install power/data block 14 at extrusion piece 16, a first end cap 44*a* is installed along the convex upper surface 18 of extrusion piece at a location that is spaced from the end of extrusion piece 16 by a distance that is approximately equal to the length of housing 30 (FIGS. 12 and 13). First end cap 44*a* has protrusions 46 that lock into channels 48 in upper surface 18 so that end cap 44*a* may slide longitudinally along extrusion piece 16, but cannot be pulled upwardly or laterally away from the extrusion piece 16. End caps 44*a*, 44*b* are fastened to housing 30 with fasteners 47 (FIGS. 27 and 30) once the housing 30 is installed as in FIG. 14. Optionally, first end cap 44*a* may be fastened directly to extrusion piece 16 with screws or other fasteners.

Figure 15:
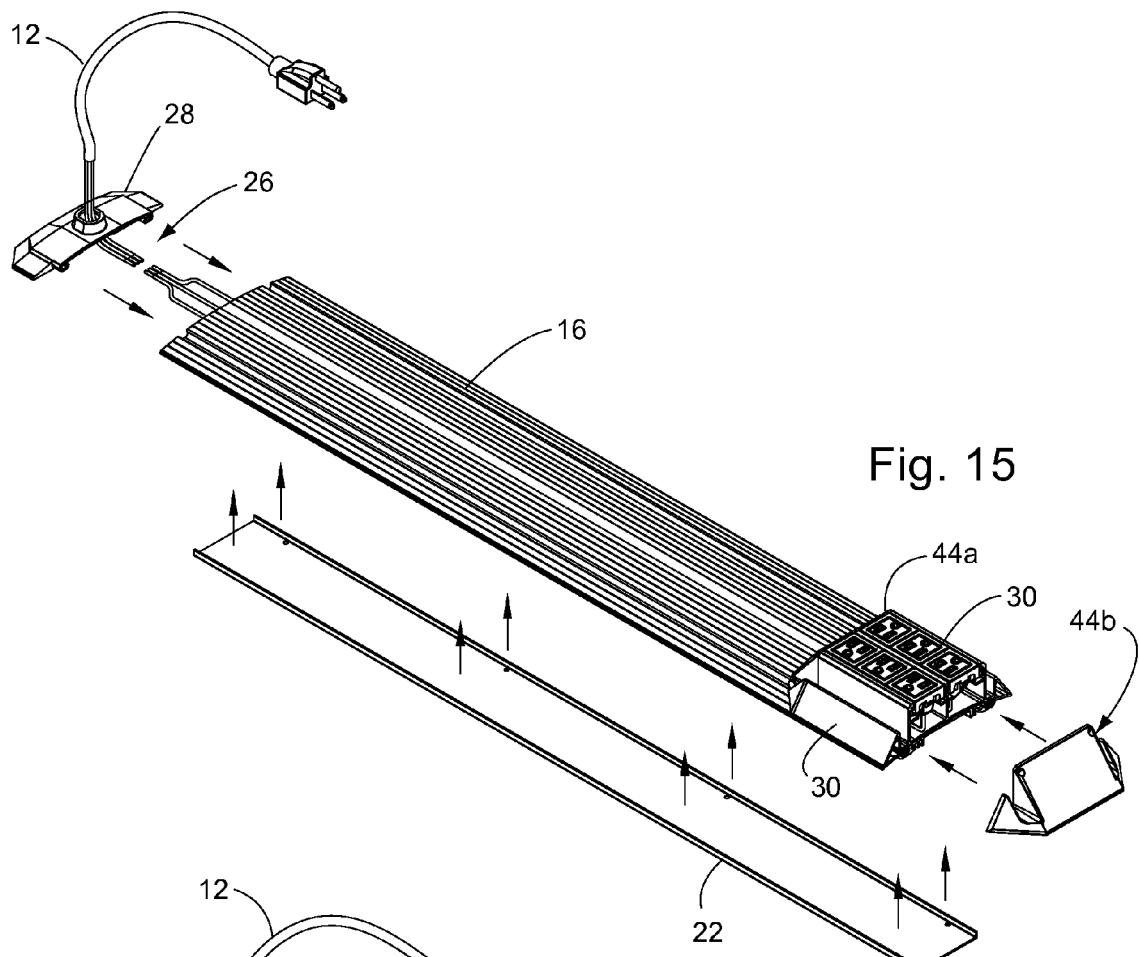
FIG. 15 is a partial-exploded perspective view of the one-piece floor runner, depicting final assembly steps.
Figure 16:
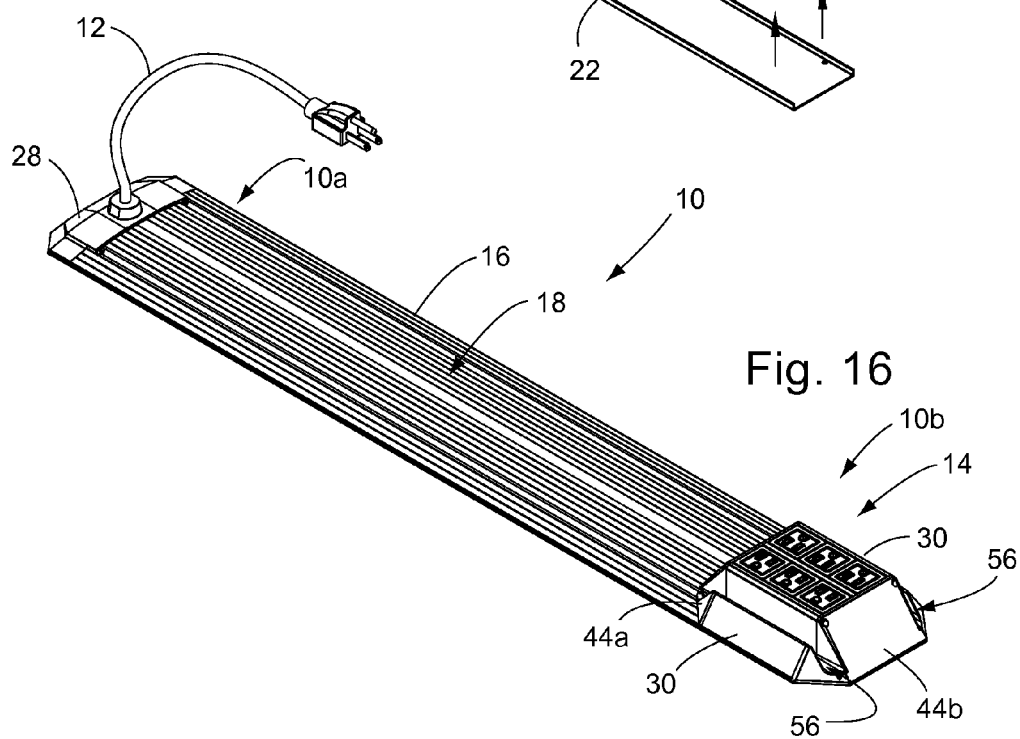
FIG. 16 is a perspective view of the one-piece floor runner shown fully assembled.
Figure 26:
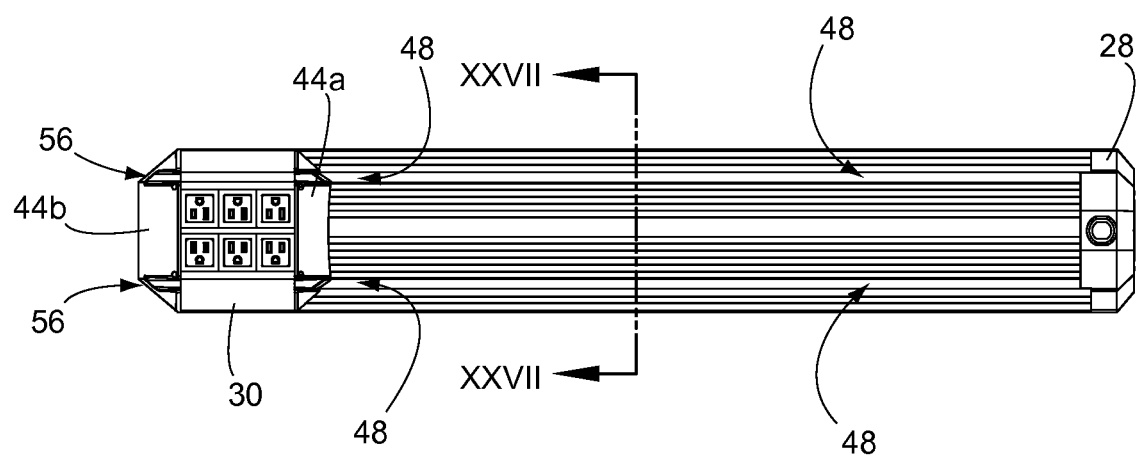
FIG. 26 is a top plan view of a one-piece floor runner, having its power cord omitted.

Once first end cap 44*a* is installed, housing 30 with power outlets 32 may be slid longitudinally along extrusion piece 16, with protrusions 50 of housing 30 in sliding engagement in channels 48, as in FIG. 13, until housing 30 is in abutment with first end cap 44*a* and is substantially flush with the end of extrusion piece 16 (FIG. 14). During the installation of housing 30 with power outlets 32, wiring 26 may be routed in channel 24 in the underside of extrusion piece (FIGS. 13 and 14). With housing 30 and power outlets 32 installed, second end cap 44*b* is fastened at the end of housing that is opposite first end cap 44*a*, to cover and protect the wiring 26 and power outlets 32, and to entrap the power outlets 32 at housing 30 between the end caps 44*a*, 44*b* (FIG. 15). Each end cap 44*a*, 44*b* includes respective bores 52 (FIG. 12) that align with screw-receiving channels 54 in housing 30 (FIG. 11), so that threaded fasteners can be used to secure the end caps 44*a*, 44*b* to each side of housing 30. With electrical wiring 26 disposed in channel 24, bottom cover 22 may then be installed (FIG. 15) to enclose channel 24 and protect the wiring 26, which completes the floor runner assembly 10 as shown in FIG. 16.

Figure 28:
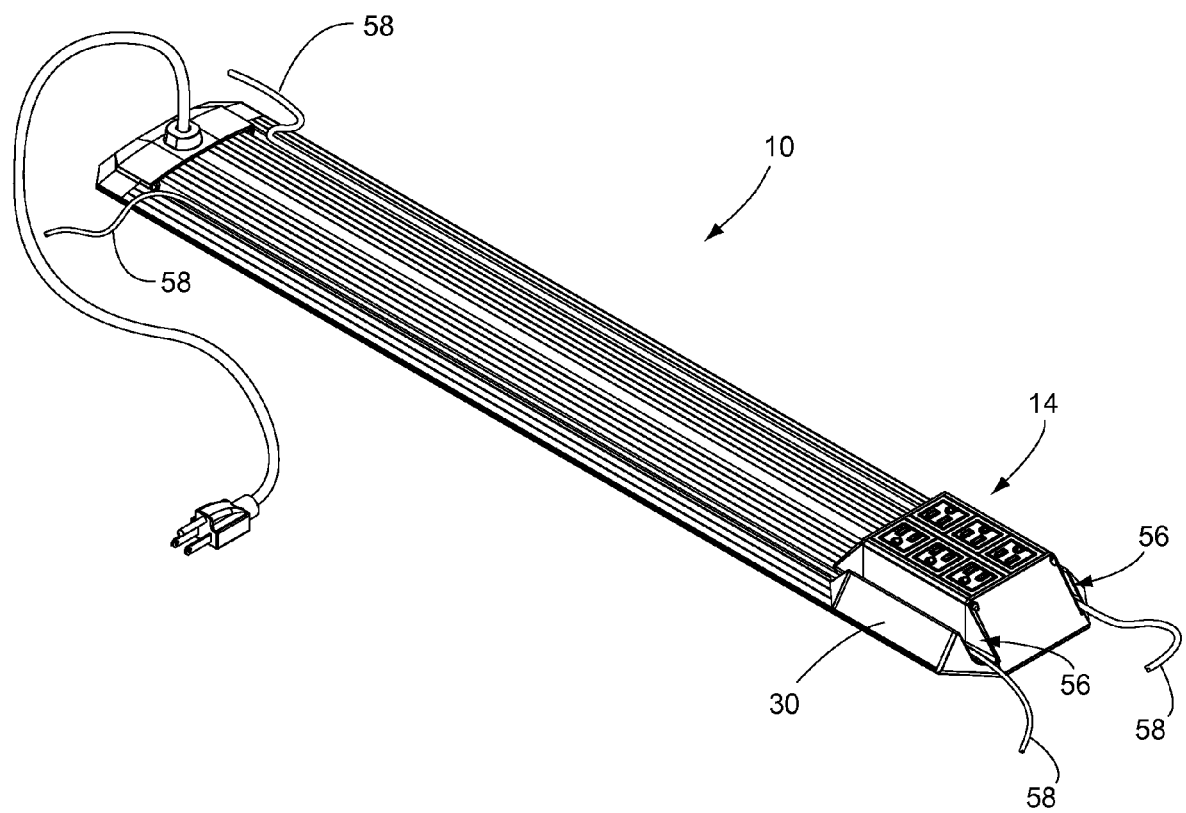
FIG. 28 is a perspective view of the one-piece floor runner, having wires routed externally along channels of the floor runner.

End caps 44*a*, 44*b* and housing 30 cooperate to define side channels 56 (FIGS. 5, 7, 16, and 26-30) that are arranged longitudinally and in alignment with channels 48 in the top surface 18 of extrusion piece 16. Side channels 56 facilitate the optional routing of auxiliary wiring 58 (FIGS. 28-30) along the top surface 18 of extrusion piece 16. Auxiliary wiring 58 may include data lines or telephone lines that are routed through channels 48, 56, and at least temporarily secured in the channels 48, 56, such as to reduce tripping hazards. As shown in FIGS. 28-30, wiring 58 is routed through channels 48 in the top surface 18 of extrusion piece 16, and exit the channels 48 of extrusion piece 16 near end cap 28 (FIG. 28), and also exit the channels 48 at the other end 10*b* of assembly 10 and pass through side channels 56 of end caps 44*a*, 44*b* and housing 30 (FIGS. 29 and 30). Optionally, and as will be described in more detail below, retainer clips may be provided along channels 48 in extrusion piece 16 to help retain wiring 58 in the channels 48.

Elongate extrusion piece 16 may be cut to substantially any desired length prior to the installation of end caps and electrical components to form electrical floor runner assembly 10, such as shown in FIGS. 23-25, in which long, medium, and short floor runner assemblies are shown. Regardless of the desired finished length, it will be appreciated that the electrical floor runner assembly may be assembled in the same or substantially the same way, from the same or substantially the same components, because only the length of elongate extrusion piece 16 (and, optionally, the lengths of electrical wiring 26) will differ from one assembly to another.

In addition, and with reference to FIGS. 17-22, power/data block 14 may be configured to accommodate substantially any desired number or type of power or data outlets, such as six power outlets 32 (FIG. 17) as described above, three power outlets 32 plus one phone and data outlet 60 plus a switch or circuit breaker 62 (FIG. 18), ten power outlets 32 (FIG. 19), four power outlets 32 (FIG. 20), five power outlets 32 plus a video and sound data outlet 64 plus two switches or circuit breakers 62 (FIG. 21), or two power outlets 32 plus two switches or circuit breakers 62 (FIG. 22), for example. Optionally, it is envisioned that the power/data block could incorporate one or more accessories or devices to provide a useful function, such as a clock, a power load indicator, a data signal indicator, a wireless transmitter or router, or the like. Thus, it will be appreciated that power/data block 14 may be sized (by cutting housing 30 to the appropriate length) and fitted with substantially any number or type of power and/or data outlets as desired for a given application.

Figure 84:
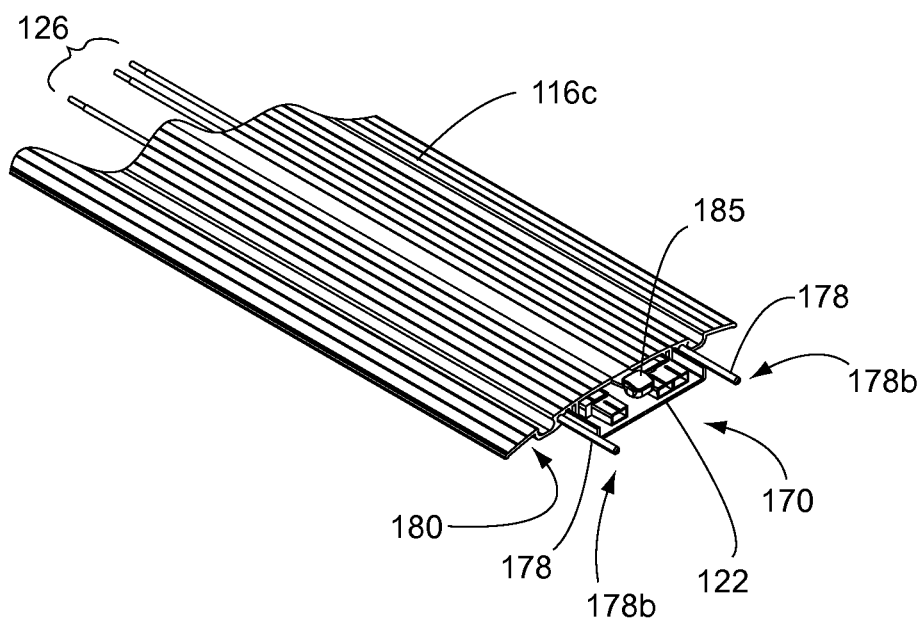
FIG. 84 is another perspective view of the male coupler end of the middle extension portion of FIG. 83, with the alignment/support pins shown fully installed.

Referring now to FIGS. 31-84, the modular electrical floor runner assembly 110 is identical or substantially identical in many respects to the one-piece electrical floor runner assembly 10, described above. For example, modular assembly 110 includes a cord extension 112 at an end cap 128, a power/data block 114, and two or more elongate extrusion pieces 116 (FIGS. 31 and 32), all of which correspond to like components of the one-piece assembly 10. The primary difference between modular assembly 110 and one-piece assembly 10 is the use of two or more elongate extrusion pieces 116, each of which includes a male connector 170 and/or a female connector 172 for mechanically and electrically coupling one extrusion piece 116 (and associated electrical wiring 126) to an adjacent extrusion piece or another component.

For example, and with reference to FIGS. 31 and 32, modular assembly 110 includes two extrusion pieces 116*a*, 116*b*, each associated with a respective opposite end portion 110*a*, 110*b*) of module assembly 110. Extrusion pieces 116*a*, 116*b* have respective ends 174, 176 that house female connector 172 and male connector 170, respectively (FIG. 33). Optionally, a pair of pins or projections 178 (FIGS. 33, 34, 83, and 84) extend from the end 176 of extrusion piece 116*b*, on either side of male connector 170, and engage the end 174 of extrusion piece 116*a* during assembly of the extrusion pieces 116*a*, 116*b* (FIGS. 33-35), to help ensure alignment of the male connector 170 with female connector 172, and to enhance the structural rigidity and strength of the connection between the extrusion pieces. Thus, extrusion pieces 116*a*, 116*b* may be joined directly together as shown in FIGS. 31-35 to form the completed modular assembly 110 (FIG. 32), or may be joined to a middle extension piece 116*c* (FIGS. 37, 40, and 49-54), or substantially any desired number of middle extension pieces, to form a modular assembly having a desired finished length.

Middle extrusion piece 116*c* has opposite ends 180, 182 (FIGS. 37 and 49-54) that correspond to the ends 172, 174 of extrusion pieces 116*a*, 116*b*, respectively, so that, if desired, middle extrusion piece 116*c* can be readily coupled between the extrusion pieces 116*a*, 116*b* in the same manner that extrusion pieces 116*a*, 116 couple to one another as shown in FIGS. 31-35. The respective ends 174, 182 of extrusion pieces 116*a*, 116*c* (both of which house female connectors 172 as shown in FIGS. 33 and 34) each include an aperture 184 in the convex upper surface 118 of the extrusion piece, which receives a locking tab 185 of the male connector 170, such as shown in FIG. 35.

Figure 51:
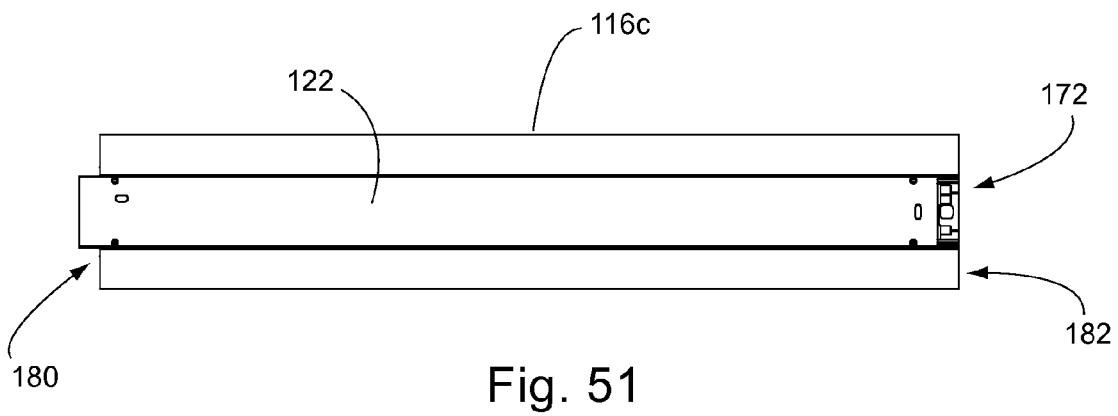
FIG. 51 is a bottom elevation of the optional middle extension portion of FIG. 49.
Figure 55:
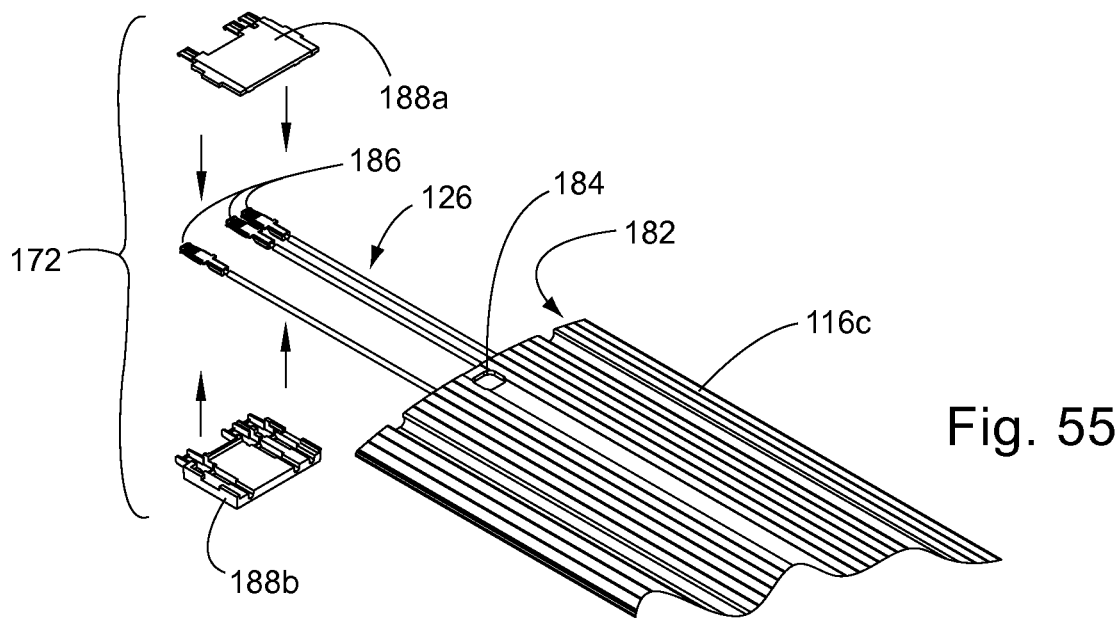
FIG. 55 is a partially-exploded perspective view of the female coupler end portion of the middle extension portion of the modular floor runner, showing an assembly step of the (male/female) electrical connector.
Figure 56:
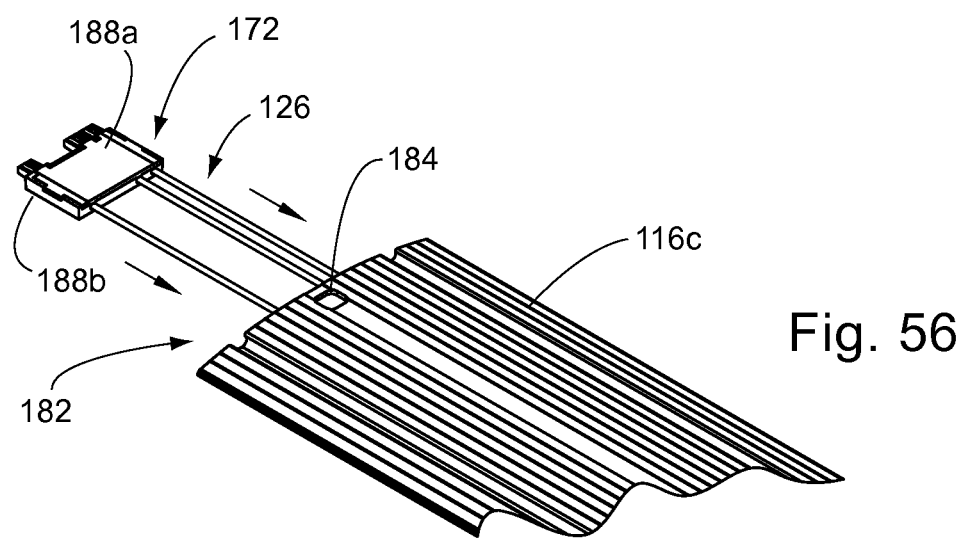
FIG. 56 is a perspective view of the female coupler end portion of the middle extension portion of the modular floor runner, showing the female electrical connector being installed.
Figure 57:
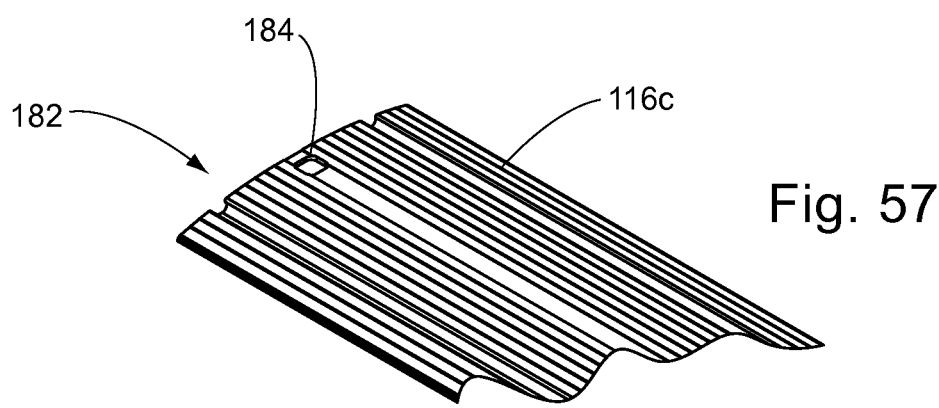
FIG. 57 is a perspective view of the female coupler end portion of the middle extension portion of the modular floor runner, in which the female electrical connector is fully installed.
Figure 58:
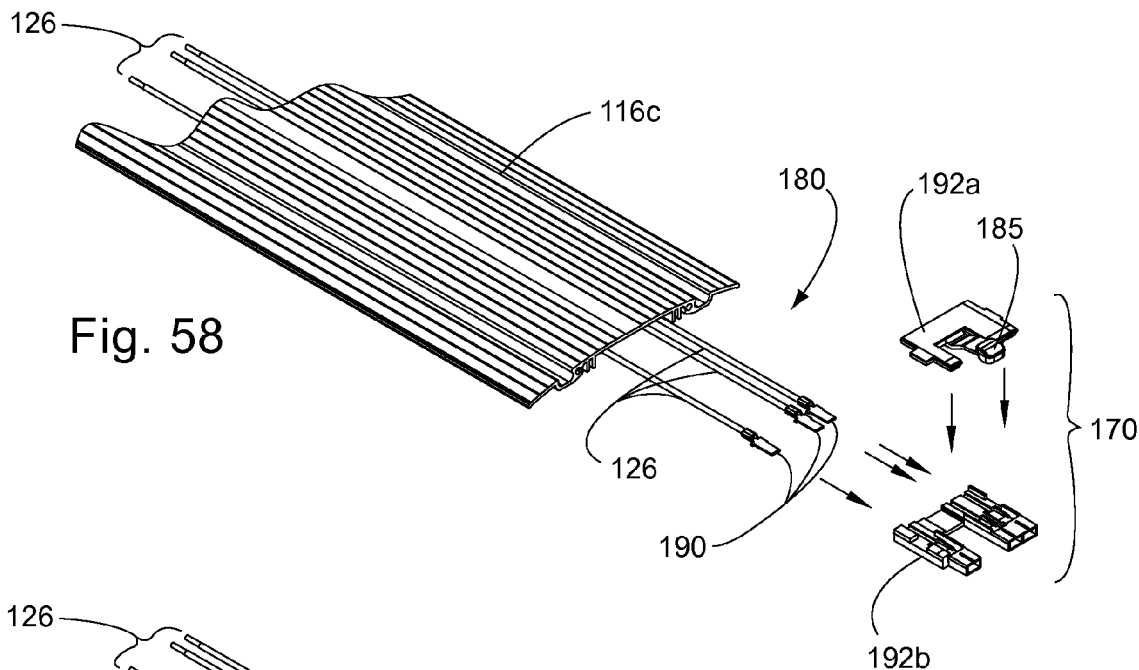
FIG. 58 is a partially-exploded perspective view of the male coupler end portion of the middle extension portion of the modular floor runner, showing an assembly step of the male electrical connector.
Figure 59:
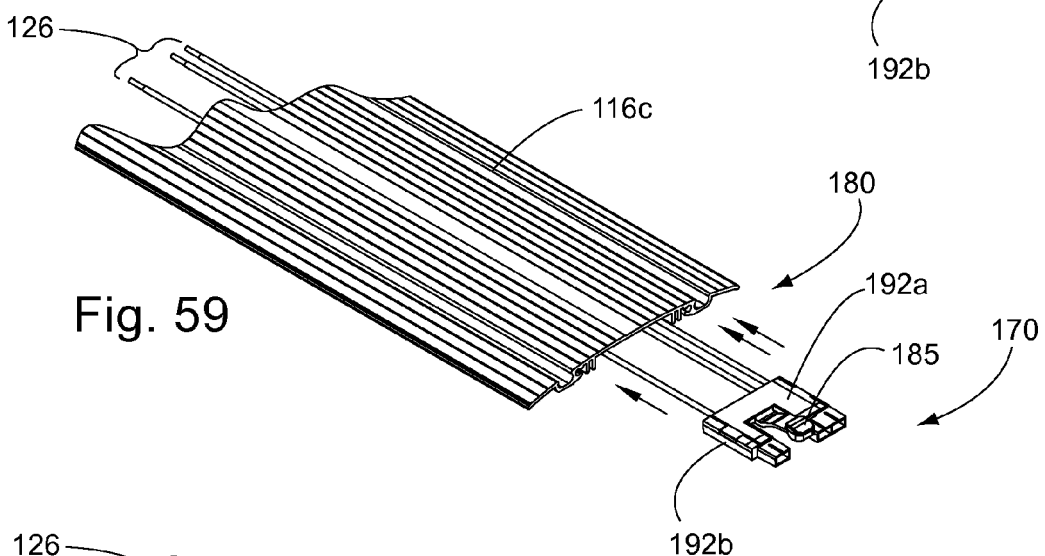
FIG. 59 is a perspective view of the male coupler end portion of the middle extension portion of the modular floor runner, showing the male electrical connector being installed.

The end 182 of middle extension piece 116*c* is representative of the end 174 of extrusion piece 116*a*, and receives female connector 172 in an assembly process such as shown in FIGS. 55-57. Female connector 172 includes female wire terminals 186 at the ends of wires or wiring 126, which are substantially enclosed in female connector housing halves 188*a*, 188*b* (typically made of resinous plastic or the like) that snap together or are fastened together over terminals 186 to form the finished female connector 172, in the manner shown in FIGS. 55 and 56. Once the female connector 172 is assembled (FIG. 56), it is inserted into the end 182 of middle extension piece 116*c* so that the female connector 172 does not protrude (FIG. 57). As shown in FIG. 51, the bottom cover 122 may be recessed inwardly from end 182 to leave space below female connector 170, for receiving a projecting portion of another bottom cover 122, as described below.

Figure 60:
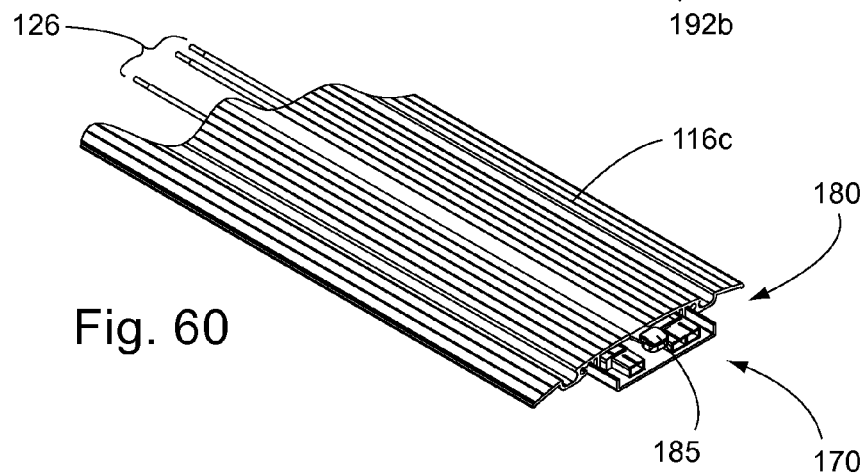
FIG. 60 is a perspective view of the male coupler end portion of the middle extension portion of the modular floor runner, in which the male electrical connector is fully installed.

The other end 182 of middle extension piece 116*c* is representative of the end 176 of extrusion piece 116*b*, and receives male connector 170 in an assembly process as shown in FIGS. 58-69. Male connector includes male wire terminals 190 (such as blade-type terminals, shown) at the ends of wires or wiring 126, which are substantially enclosed in male connector housing halves 192*a*, 192*b* that snap together or are fastened together over terminals 190 to form the finished male connector 170, in the manner shown in FIGS. 58 and 59. Once the male connector 170 is assembled (FIG. 59), it is inserted into the end 180 of middle extension piece 116*c* so that a portion of the male connector extends outwardly therefrom (FIG. 60). As shown in FIGS. 51 and 60, the bottom cover 122 may be extended outwardly from end 180 to protect male connector 170 where it extends from the end 180 of extrusion piece 116*c*. The extending portion of bottom cover 122 will extend below a part of female connector 172 when the end 180 of extension piece 116*c* is assembled to the end 174 of extension piece 116*a*, for example. Male connector housing half 192*a* includes locking tab 185, which is a resilient projection that extends upwardly, and has a portion that extends into aperture 184 of another extrusion piece when the extrusion pieces are assembled together. Locking tab 185 may be released (for separation of the extrusion pieces) by depressing the locking tab and pulling the extrusion pieces apart. When assembling the extrusion pieces together, locking tab 185 is resiliently biased into aperture 184 once the pieces are fully engaged, to secure the pieces together, such as shown in FIG. 35.

Figure 61:
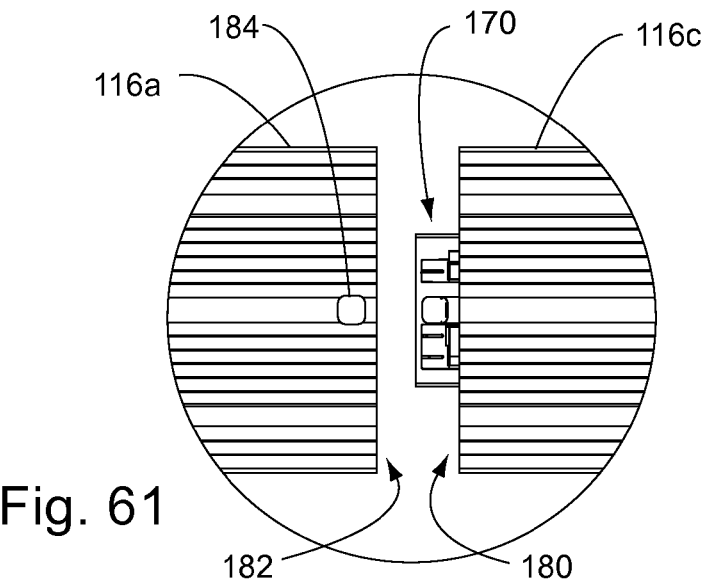
FIGS. 61-63 are enlarged top plan views of the joining steps for the male coupler end of the middle extension portion and the female coupler end of the outlet block end portion of the modular floor runner.
Figure 62:
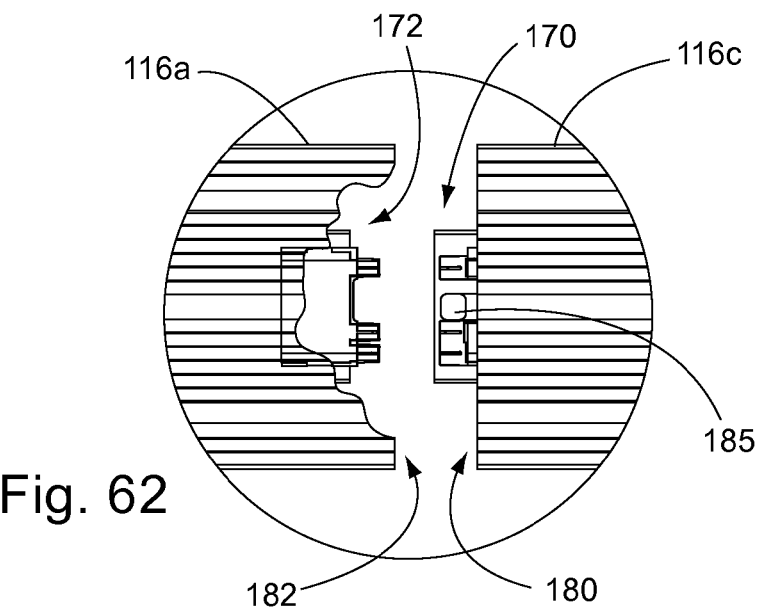
Figure 63:
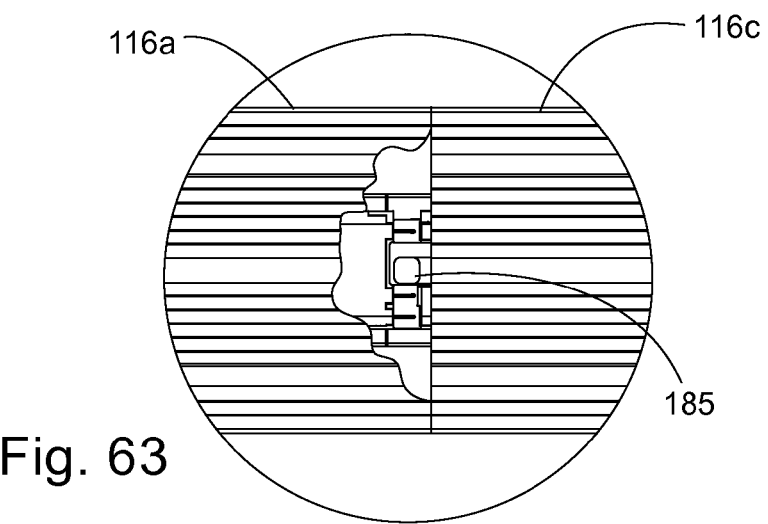

The assembly process is further depicted in FIGS. 61-63, and in corresponding FIGS. 66-68, in which FIG. 66 generally corresponds to FIG. 63, FIG. 67 generally corresponds to FIG. 62, and FIG. 66 generally corresponds to FIG. 61. In FIGS. 63 and 66, end 180 of middle extension piece 116*e* abuts end 182 of extrusion piece 116*a* and locking tab 185 is in its locking configuration disposed in aperture 184. Also, the male (wire terminals 190 are fully seated in female wire terminals 186, as best shown in FIG. 66. In FIGS. 62 and 67, the ends 180, 182 are somewhat separated, and locking tab 185 is biased downwardly to fit in the open end 182 of extrusion piece 116a. In FIGS. 61 and 68, the ends 180, 182 are fully separated and ready for re-engagement, if desired.

Figure 69:
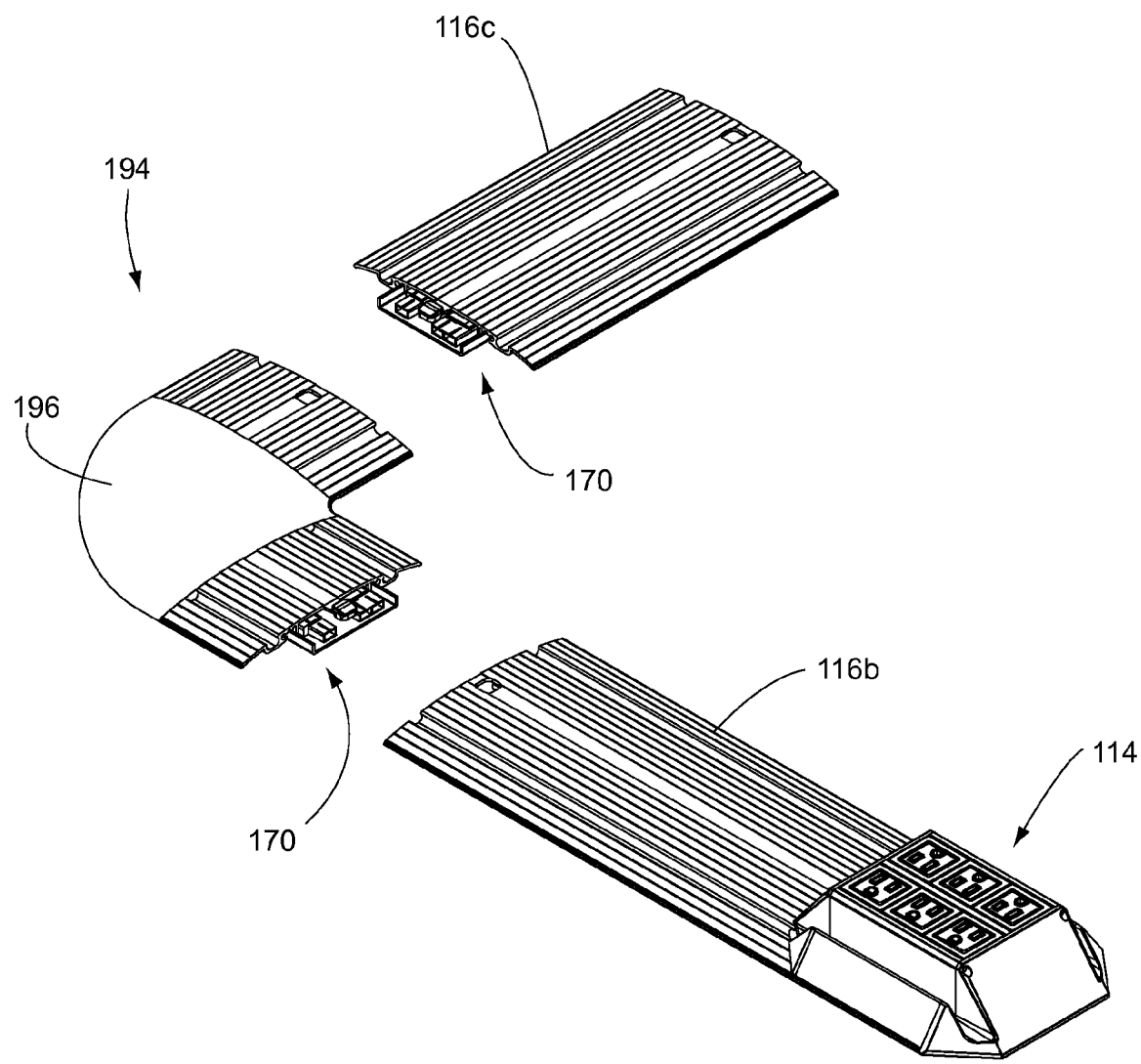
FIG. 69 is a partially-exploded perspective view of an optional 90-degree corner portion of the modular floor runner, shown with an outlet block portion and a middle extension portion.

Optionally, a 90-degree corner assembly 194 can be used to adapt the modular electrical floor runner assembly to follow wall corners or other non-straight paths (FIG. 69). Corner assembly 194 includes a corner piece 196, which may be fitted with a pair of extrusions 116, including male and female connectors, for engagement with extrusion pieces 116a-c (extrusion pieces 116b, 116c, shown). Corner piece 196 may be a molded part that includes a channel for routing wiring from one extrusion piece to another. It will be appreciated that substantially any other shape of angle or corner or curve may be readily provided, so that any desired angle or corner may be accommodated. In addition, it is envisioned that upwardly or downwardly angled pieces may be used to change the elevation of the modular electrical floor assembly, such as an angled piece that provides a 45-degree or 90-degree upward or downward bend, for routing the assembly upwardly or downwardly to another elevation or level, such as onto a table or the like.

Figure 73:
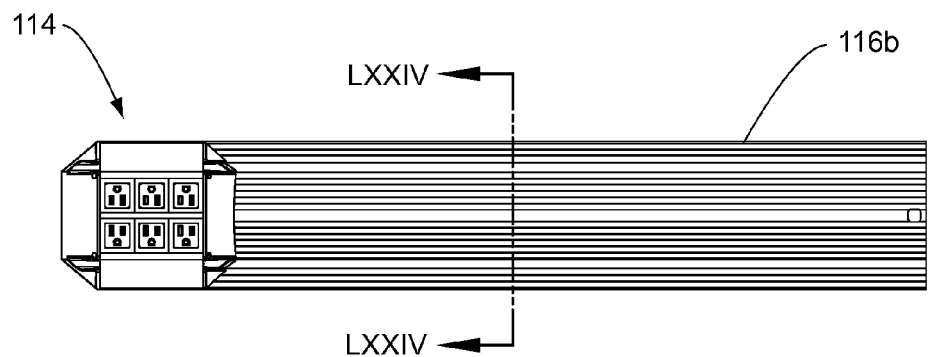
FIG. 73 is another top plan view of the outlet block end portion.
Figure 74:
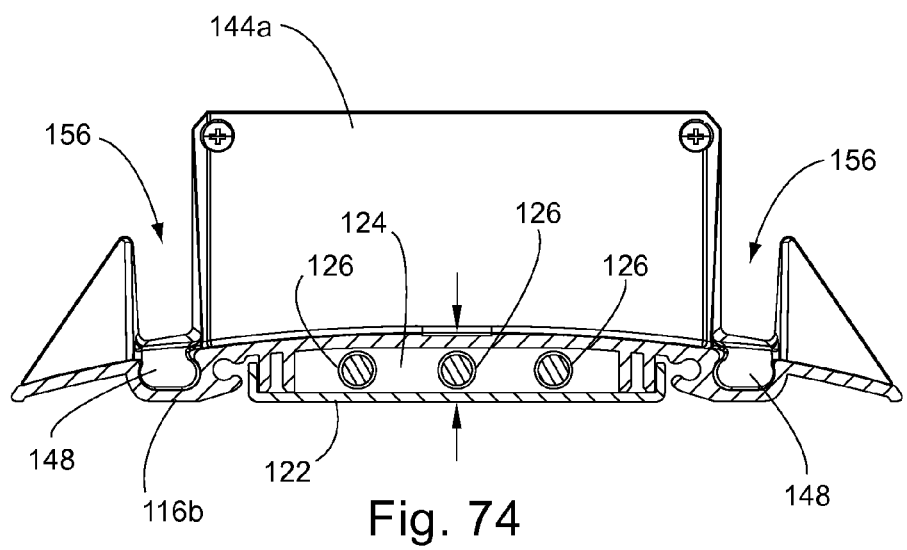
FIG. 74 is a sectional end view of the outlet block end portion, taken along line LXXIV-LXXIV of FIG. 73.
Figure 75:
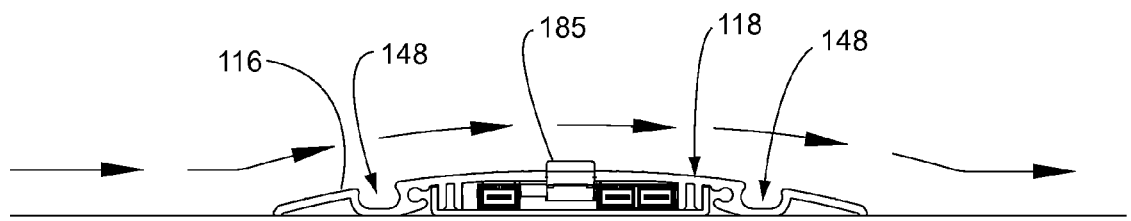
FIG. 75 is an end elevation of the middle extension portion supported on a floor surface.
Figure 76:
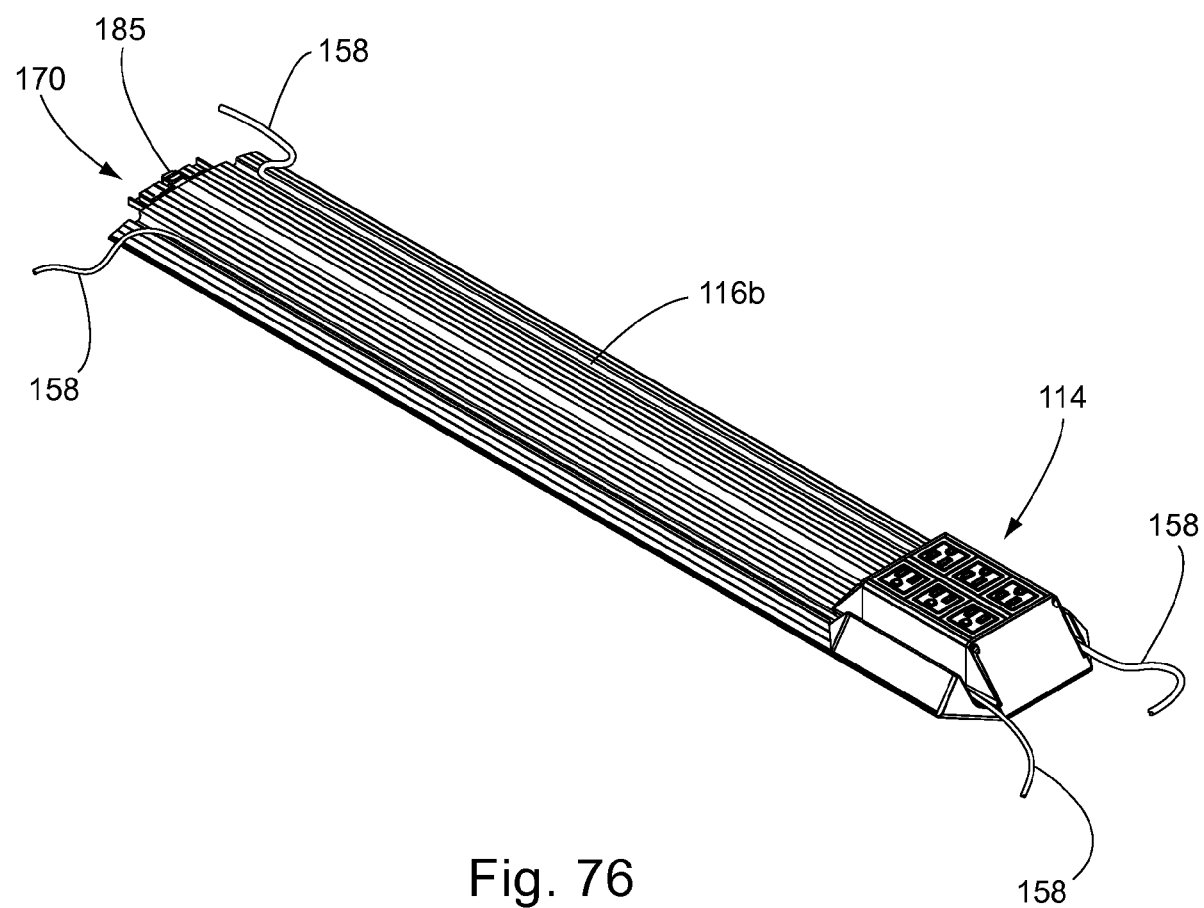
FIG. 76 is another perspective view of the outlet block end portion of the modular floor runner, having wires routed externally along the runner.
Figure 77:
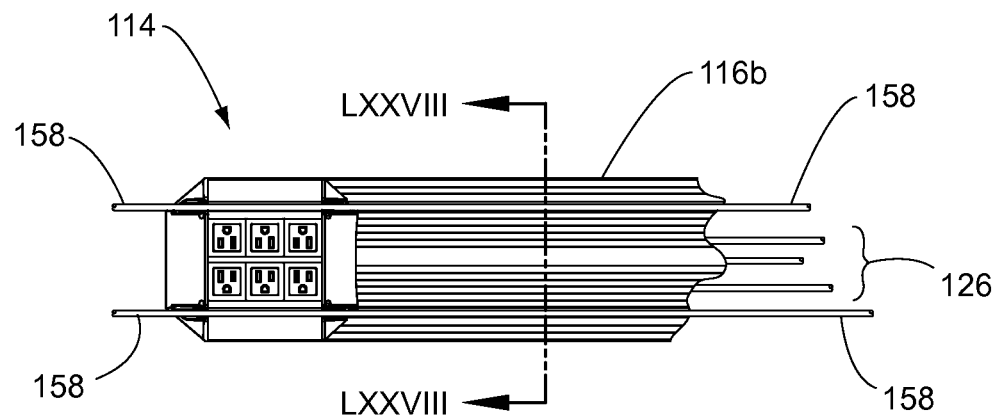
FIG. 77 is a top plan view of an end portion of the outlet block end portion of FIG. 76.
Figure 78:
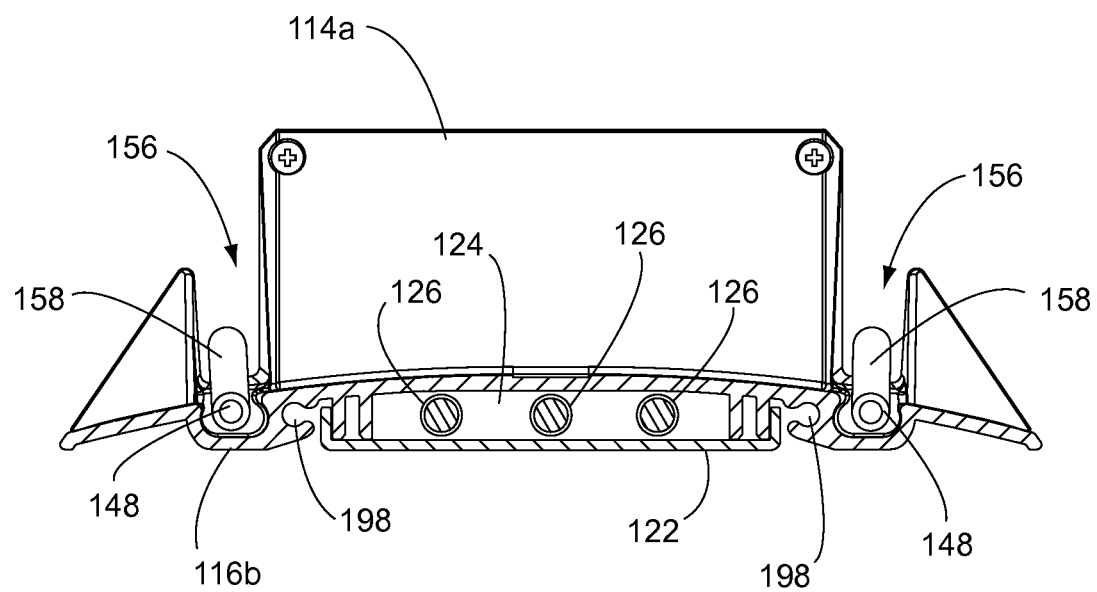
FIG. 78 is a sectional end view taken along line LXXVIII-LXXVIII of FIG. 77.

As with one-piece floor runner assembly 10, modular floor runner assembly 110 may have its various extrusions 116 cut or formed in different lengths, such as shown with reference to extrusion piece 116b in FIGS. 70-72, As shown in FIGS. 73 and 74, the extrusion piece 116b and power/data block 114 may be formed in substantially the same manner as the corresponding components of one-piece assembly 10, including a bottom cover 122 for enclosing a channel 124 for wiring 126. As shown in FIG. 75, extrusion piece 116b (and, thus, extrusion pieces 116a and 116c as well) provides a low-height profile that is unobtrusive and easily stepped over, so that modular assembly 110 (and one-piece assembly 10) can be used in walking areas. Likewise, modular assembly 110 can accommodate auxiliary wires 158 (FIGS. 76-78) in substantially the same manner as does one-piece assembly 10.

Optionally, and as shown in FIGS. 79-82, a retainer clip 196 having an inverted U-shape is positionable along extrusion piece 16, 116b (representative of any extrusion piece) at channel 48, 148 to retain or secure auxiliary wires 158 in the channel 48, 148. Retainer clip 196 may be resilient or spring-like, so that its ends can be squeezed inwardly (as shown by arrows in FIG. 80) and its ends pushed downwardly into channel 48, 148 so that the clip 196 snaps into place around wire 158 and is held in the channel 48, 148 by the outward biasing force of the legs of the clip 196 pushing outwardly against the inner surfaces that define channel 48, 148. Multiple clips 196 may be used along extrusion piece(s) 16, 116 to retain wires 58, 158 in the channels 48, 148. Optionally, the clips may be elongated so as to cover substantially the entire channel 48, 148 and protect and retain the auxiliary wires 158 therein.

Figure 83:
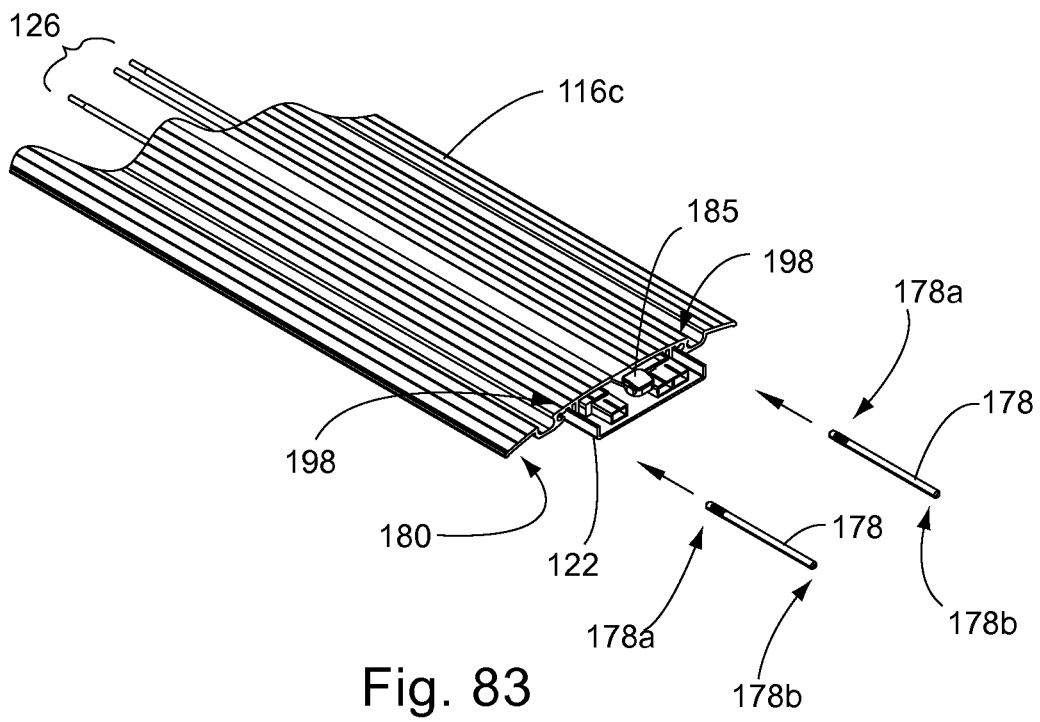
FIG. 83 is a perspective view of the male coupler end of the middle extension portion of the modular floor runner, showing the installation of alignment/support pins.

Referring to FIGS. 83 and 84, alignment pins 178 include threaded end portions 178a that threadedly engage respective screw channels 198 (best shown with reference to extrusion piece 16b in FIGS. 78 and 82) in the end 180 of middle extension piece 116c. When fully installed, distal end portions 178b of alignment pins 178 extend beyond male connector 170 so that when the end 180 middle extension piece 116c is aligned for engagement with the end 174 of extrusion piece 116a, for example, the distal end portions 178b will be received in the screw channels 198 in the end 174 of extrusion piece 116a (on either side of the female connector 172) before the male and female connectors 170, 172 engage one another. This helps ensure proper alignment of the connectors 170, 172 prior to their coupling, and also can significantly increase the structural strength and rigidity in the junction between two adjacent extrusion pieces. Alignment pins 178 may be made from steel or other sufficiently strong material, for example, to resist bending or flexing of the completed modular runner assembly 110 at each junction between adjacent extrusion pieces 116. The extrusion pieces 116 may be made from extruded aluminum or other sufficiently strong and substantially rigid materials, such as resinous plastic or fiber-filled or glass-filled resinous plastic or the like, or hard rubber or synthetic rubber or the like, for example.

Optionally, and as shown in FIGS. 31, 32, 42, and 43, cord extension 112 includes a power connector 200 with integral circuit breaker 202 that will trip in the event of an overload at power/data block 114, and that can be reset once the overload condition has been remedied. Optionally, a breaker may be included in-line along the cord extension 112, or at end cap 128, along extrusion piece 116a, or at power/data block 114.

Therefore, the present invention provides an electrical floor runner incorporating wiring and electrical and/or electronic or data outlets, such as for use in office areas, industrial or work spaces, homes, or the like. The electrical floor runner is generally low-profile and unobtrusive, so that it may be unobtrusively placed along a floor or walking space, or along another support surface. The electrical floor runner may be a one-piece unit of substantially any desired length, or may be modular so that the length can be changed and/or the shape or routing can be adjusted as desired. The runner may include a power cord with plug or connector at one end for coupling to a wall outlet or the like, and a power/data block at the other end for receiving power and/or data couplers for other devices, such as computers and electronics, lighting, etc. The runner includes an extrusion that provides a strong, low-profile region that houses and protects electrical wiring held internally. The runner may also be used to at least temporarily accommodate auxiliary wiring, such as phone or data lines that are not part of the runner's internal wiring.

Changes and modifications in the specifically described embodiments can be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. An electrical floor runner for routing electrical power or data transmission lines from one area to another, said electrical floor runner comprising:

a first end portion configured to be electrically coupled to a power or data source;

a second end portion, opposite said first end portion;

a housing coupled to said second end portion and configured to support a plurality of power or data outlets, said housing comprising an extrusion;

at least one power or data outlet positioned at said housing;

a substantially rigid elongate middle portion between said first and second end portions, said middle portion defining an elongate internal channel; and electrical wiring routed through said elongate internal channel of said middle portion between said first and second end portions, wherein said electrical wiring is electrically connectable to the power or data source, and is electrically coupled to said power or data outlet, so that said power or data outlet is electrically connectable to the power or data source;

wherein said extrusion of said housing is configured to be cut to a desired length to accommodate a desired number and type of power or data outlets, whereby said housing is configurable to support the desired power or data outlets.

2. The electrical floor runner of claim 1, wherein said middle portion comprises a generally convex upper surface and a generally planar lower surface.

3. The electrical floor runner of claim 1, wherein said housing comprises a pair of opposite end caps, and wherein said at least one power or data outlet is positioned along said extrusion between said opposite end caps.

4. The electrical floor runner of claim 3, wherein said at least one power or data outlet comprises at least one power outlet and at least one data outlet.

5. The electrical floor runner of claim 1, wherein each of said elongate middle portion and said first and second end portions is comprised of an extrusion.

6. The electrical floor runner of claim 5, wherein said elongate middle portion and said first and second end portions are comprised of a single unitary extrusion.

7. The electrical floor runner of claim 1, wherein said elongate middle portion comprises at least one middle extension portion that is releasably connectable between said first and second end portions.

8. The electrical floor runner of claim 7, wherein said middle extension portion comprises an angled portion forming a bend in said floor runner.

9. The electrical floor runner of claim 8, wherein said angled portion comprises an approximately 90-degree bend.

10. The electrical floor runner of claim 7, wherein said middle extension portion and said first and second end portions comprise separate extrusions having substantially identical cross sections.

11. The electrical floor runner of claim 10, wherein said middle extension portion comprises opposite end portions, a first of said opposite end portions of said middle extension portion including a male electrical coupler and a second of said opposite end portions of said middle extension portion including a female coupler, said male and female electrical couplers of said middle extension portion configured to electrically engage corresponding couplers of said first and second end portions of said floor runner.

12. The electrical floor runner of claim 11, wherein at least one of said opposite end portions of said middle extension portion comprises a mechanical coupler for releasably securing said middle extension portion to one of said first and second end portions of said floor runner.

13. The electrical floor runner of claim 12, wherein said mechanical coupler further comprises a pin configured to align said male and female electrical couplers and to provide structural support to said floor runner where said middle portion joins to at least one of said first and second end portions of said floor runner.

14. The electrical floor runner of claim 1, wherein said at least one power or data outlet comprises a spill-resistant electrical power outlet.

15. The electrical floor runner of claim 1, wherein said first and second end portions and said middle portion each defines an elongate outer channel for receiving an external wire.

16. The electrical floor runner of claim 15, further comprising a retainer-clip for releasably engaging any of said first and second end portions and said middle portion of said floor runner at said outer channel, wherein said retainer-clip is configured to retain the external wire at said outer channel.

17. An electrical floor runner for routing electrical power or data transmission lines from one area to another, said electrical floor runner comprising:
   a first end portion configured to be electrically coupled to a power or data source, and defining a first internal channel;
   a second end portion, opposite said first end portion, and defining a second internal channel;
   an outlet housing positioned at said second end portion;
   at least one power or data outlet positioned at said outlet housing;
   a substantially rigid elongate middle portion between said first and second end portions, said middle portion defining an elongate internal channel; and
   electrical wiring routed through said elongate internal channel of said middle portion and through said first and second internal channels of said first and second end portions, wherein said electrical wiring is electrically connectable to the power or data source, and is electrically coupled to said power or data outlet at said outlet housing, so that said power or data outlet is electrically connectable to the power or data source;
   wherein said outlet housing is configured to be cut to a desired length to accommodate a desired number and type of power or data outlets, whereby said outlet housing is configurable to support the desired power or data outlets.

18. The electrical floor runner of claim 17, wherein said first end portion, said second end portion, and said elongate middle portion are unitarily formed.

19. A method of providing power or data to a remote location along a walkway, said method comprising:
   routing electrical wiring through an elongate internal channel of an electrical floor runner having a first end portion, a second end portion, and a substantially rigid middle portion between the first and second end portions;
   cutting a housing a desired length to accommodate a desired number and type of power or data outlets;
   coupling the housing to the second end portion;
   positioning at least one power or data outlet at the housing;
   electrically connecting the electrical wiring to a power or data source; and
   electrically connecting the electrical wiring to the at least one power or data outlet at the housing to thereby electrically connect the at least one power or data outlet to the power or data source.

* * * * *

UNITED STATES PATENT AND TRADEMARK OFFICE
CERTIFICATE OF CORRECTION

| | | |
|---|---|---|
| PATENT NO. | : 8,616,921 B2 | Page 1 of 1 |
| APPLICATION NO. | : 13/494210 | |
| DATED | : December 31, 2013 | |
| INVENTOR(S) | : Norman R. Byrne et al. | |

It is certified that error appears in the above-identified patent and that said Letters Patent is hereby corrected as shown below:

IN THE SPECIFICATION

Column 8
Line 64, "116e" should be --116c--

Signed and Sealed this
Tenth Day of March, 2015

Michelle K. Lee
*Deputy Director of the United States Patent and Trademark Office*